(12) United States Patent
Hibi et al.

(10) Patent No.: US 10,247,544 B2
(45) Date of Patent: Apr. 2, 2019

(54) SHAPE MEASUREMENT APPARATUS AND SHAPE MEASUREMENT METHOD

(71) Applicant: NIPPON STEEL & SUMITOMO METAL CORPORATION, Tokyo (JP)

(72) Inventors: Atsuhiro Hibi, Tokyo (JP); Yusuke Konno, Tokyo (JP); Toshio Akagi, Tokyo (JP); Nobuhiro Furuya, Tokyo (JP); Tomohiro Kuroiwa, Tokyo (JP); Akihito Nakazaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/559,681

(22) PCT Filed: Dec. 20, 2016

(86) PCT No.: PCT/JP2016/087904
§ 371 (c)(1),
(2) Date: Sep. 19, 2017

(87) PCT Pub. No.: WO2018/003144
PCT Pub. Date: Jan. 4, 2018

(65) Prior Publication Data
US 2018/0283850 A1 Oct. 4, 2018

(30) Foreign Application Priority Data
Jun. 27, 2016 (JP) ................... 2016-126592

(51) Int. Cl.
*G01B 11/24* (2006.01)
*G01B 11/30* (2006.01)

(52) U.S. Cl.
CPC ............ *G01B 11/24* (2013.01); *G01B 11/306* (2013.01)

(58) Field of Classification Search
CPC ... G01B 11/24; G01B 11/2522; G01B 11/005; G01B 11/036; G01N 21/57; G01N 21/55;
(Continued)

(56) References Cited

U.S. PATENT DOCUMENTS 4,853,777 A * 8/1989 Hupp ................ G01B 11/303
348/128
5,122,672 A * 6/1992 Mansour ............ G01B 11/303
250/559.01

(Continued)

FOREIGN PATENT DOCUMENTS

EP    2 913 631 A1    9/2015
JP    63-174723 A     7/1988
(Continued)

OTHER PUBLICATIONS

Japanese Notification of Reasons for Refusal, dated Feb. 13, 2018, for corresponding Japanese Application No. 2017-519348, with an English translation.
(Continued)

*Primary Examiner* — Sang H Nguyen
(74) *Attorney, Agent, or Firm* — Birch, Stewart, Kolasch & Birch, LLP

(57) ABSTRACT

[Object] To provide a shape measurement apparatus that is capable of measuring the amount of warpage in the width direction of a strip-shaped body with higher sensitivity.
[Solution] Provided is a shape measurement apparatus including: a light source configured to irradiate a surface of a moving strip-shaped body with linear light at a prescribed angle of incidence; a screen configured such that reflected light of the linear light on the surface of the strip-shaped body is projected on the screen; an imaging unit configured to image the reflected light of the linear light projected on the screen; and an arithmetic processing unit configured to acquire the amount of warpage in a width direction of the
(Continued)

strip-shaped body on the basis of a line length of the reflected light of the linear light imaged by the imaging unit.

7 Claims, 16 Drawing Sheets

(58) Field of Classification Search
CPC ............ G01N 21/958; G01N 2201/08; G01N 2201/061; H04N 5/23216; H04N 5/23222; H04N 5/2353
See application file for complete search history.

(56) References Cited

U.S. PATENT DOCUMENTS

| | | | | |
|---|---|---|---|---|
| 5,153,844 A | * | 10/1992 | Beni | G01B 11/306 356/237.2 |
| 6,100,990 A | * | 8/2000 | Ladewski | G01N 21/55 356/124 |
| 2011/0193954 A1 | * | 8/2011 | Walecki | G01B 11/24 348/135 |
| 2015/0049345 A1 | * | 2/2015 | Miyagawa | G01B 11/002 356/625 |
| 2016/0169798 A1 | * | 6/2016 | Kostka | G01N 21/8806 356/445 |
| 2016/0261791 A1 | * | 9/2016 | Satoyoshi | G01B 11/24 |

FOREIGN PATENT DOCUMENTS

| | | | |
|---|---|---|---|
| JP | 4-160304 A | | 6/1992 |
| JP | 2004184397 A | * | 7/2004 |
| JP | 2005-3691 A | | 1/2005 |
| JP | 5488953 B2 | | 5/2014 |

OTHER PUBLICATIONS

Beckmann, "Scattering by Composite Rough Surfaces", Proceedings of the IEEE, 1965, vol. 53, Issue 8, pp. 1012-1015.
International Search Report for PCT/JP2016/087904 (PCT/ISA/210) dated Mar. 21, 2017.
Written Opinion of the International Searching Authority for PCT/JP2016/087904 (PCT/ISA/237) dated Mar. 21, 2017.
Korean Office Action, dated Jul. 19, 2018, for corresponding Korean Application No. 10-2017-7030101, along with a Partial English translation.

* cited by examiner

FIG. 10
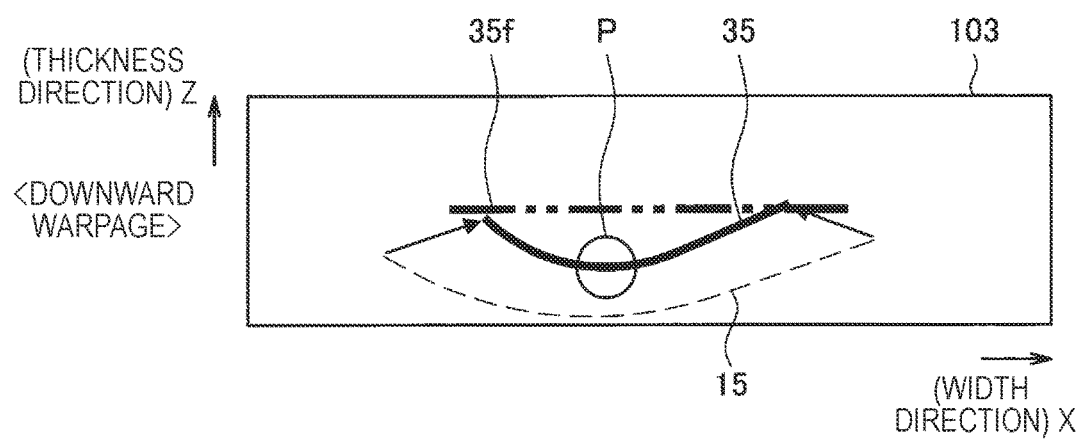
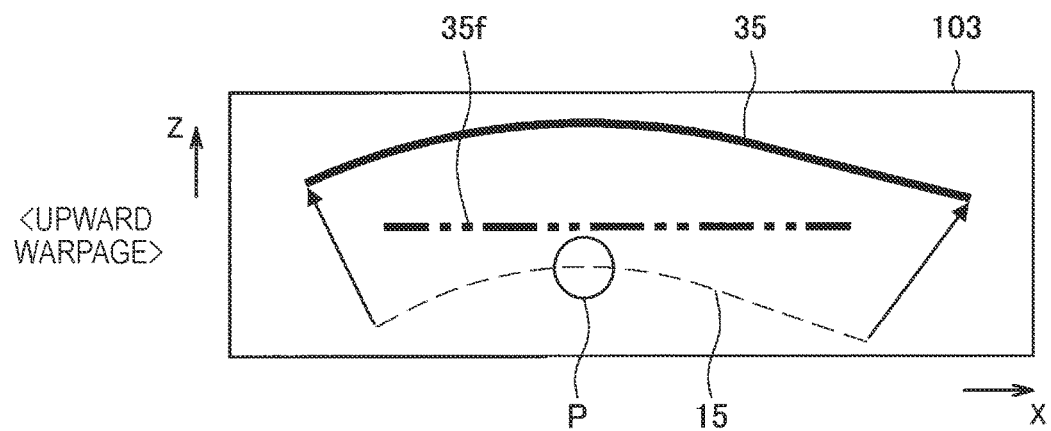

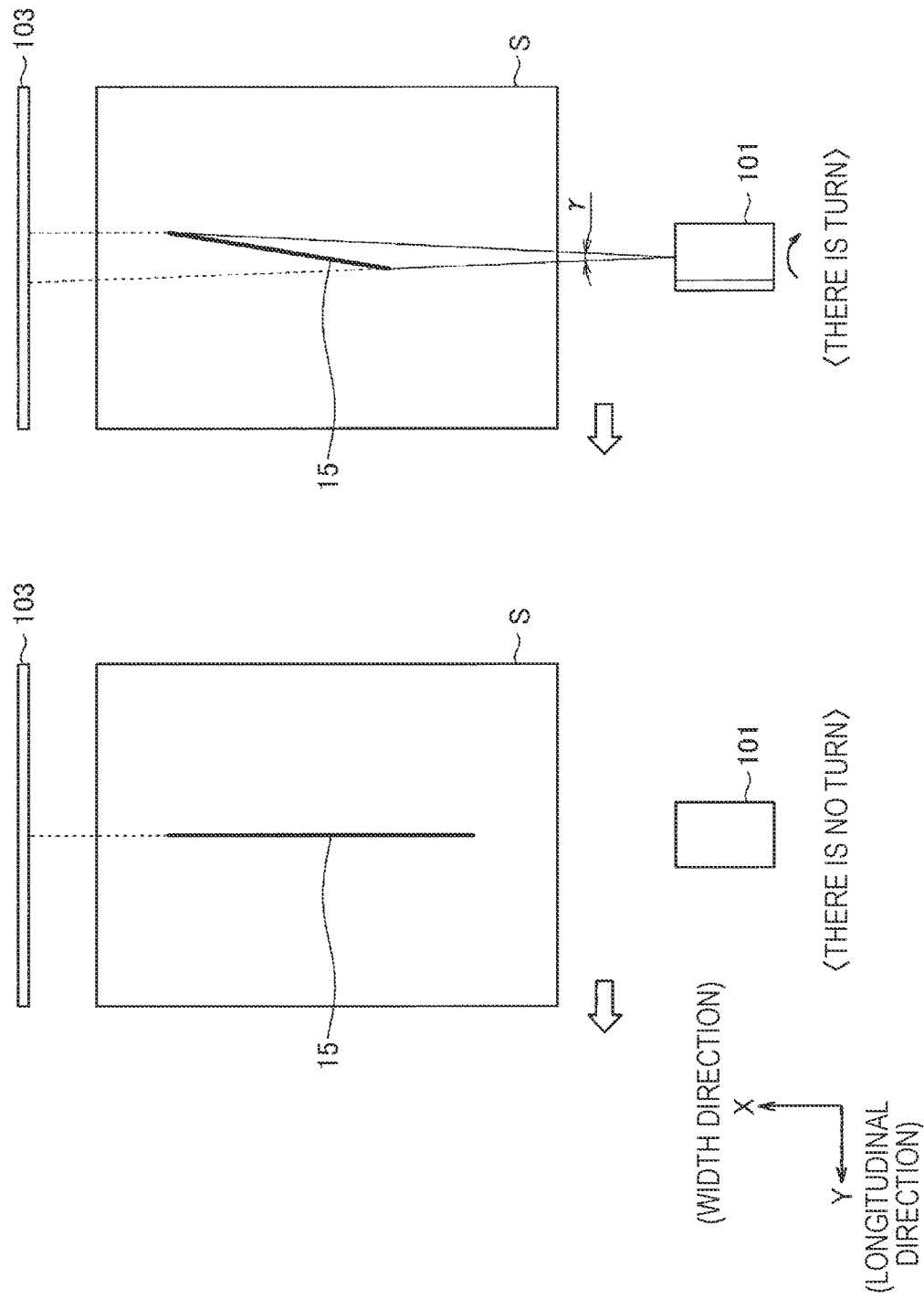

FIG. 18
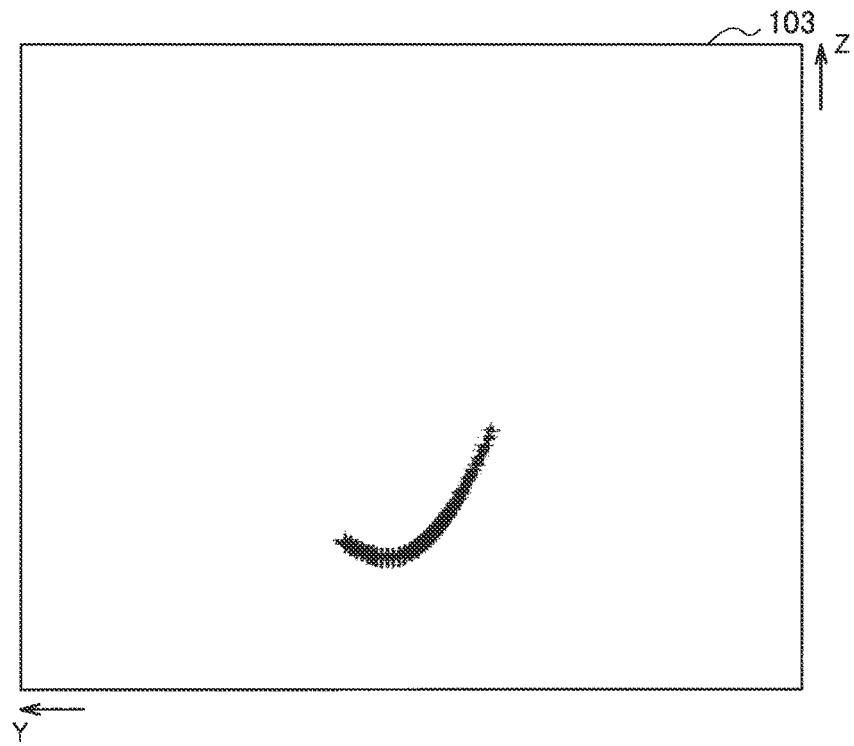
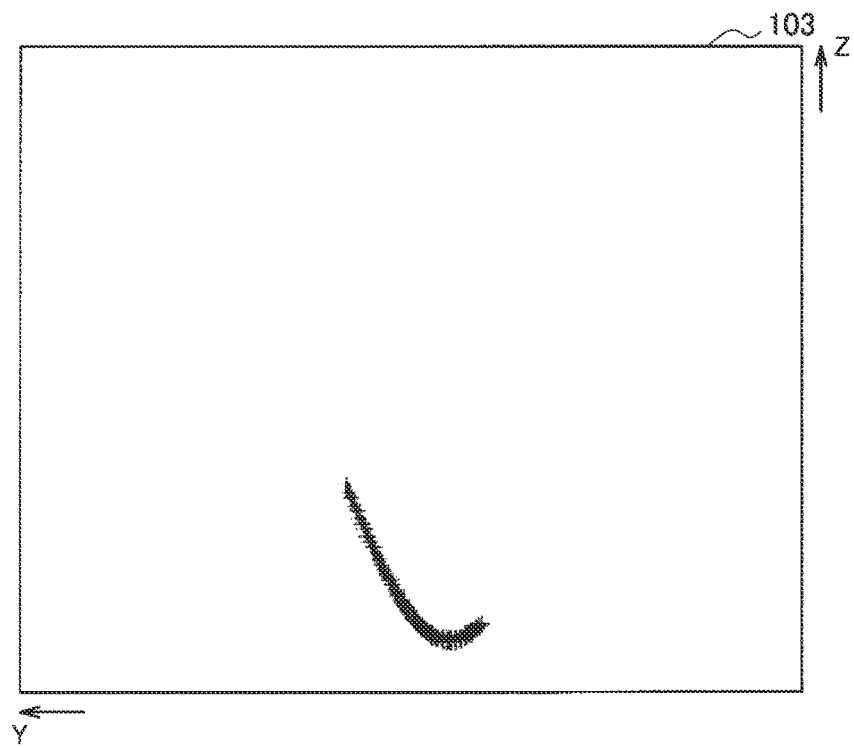

SHAPE MEASUREMENT APPARATUS AND SHAPE MEASUREMENT METHOD

TECHNICAL FIELD

The present invention relates to a shape measurement apparatus and a shape measurement method that measure the amount of warpage in the width direction of a strip-shaped body.

BACKGROUND ART

As a method for measuring the surface shape of a measurement object, there is a method that, using illumination light such as laser light or the like, images the reflected light of illumination light from the measurement object and thereby measures the surface shape of the measurement object.

For example, Patent Literature 1 discloses a technology that measures the surface shape of a strip-shaped body such as a moving steel plate as a measurement object on the basis of the principle of light section. In Patent Literature 1, the reflected light of linear light applied along the width direction of the measurement object is imaged by an area camera, and the surface unevenness information of the measurement object is acquired from the amount of displacement of the imaged reflected light of the linear light (that is, the light section line).

CITATION LIST

Patent Literature

Patent Literature 1: JP 5488953B

Non-Patent Literature

Non-Patent Literature 1: P. Beckmann, "Scattering by composite rough surfaces," Proceedings of the IEEE, vol. 53, issue. 8, 1965, pp. 1012-1015.

SUMMARY OF INVENTION

Technical Problem

However, in Patent Literature 1 above, since the amount of displacement of the light section line is directly measured, there has been a problem that the measurement of the amount of warpage is difficult when the measurement object has minute warpage.

Thus, the present invention has been made in view of the problem mentioned above, and an object of the present invention is to provide a new and improved shape measurement apparatus and a new and improved shape measurement method that are capable of measuring the amount of warpage in the width direction of a strip-shaped body with higher sensitivity.

Solution to Problem

In order to solve the above problem, according to an aspect of the present invention, there is provided a shape measurement apparatus including: a light source configured to irradiate a surface of a moving strip-shaped body with linear light at a prescribed angle of incidence; a screen configured such that reflected light of the linear light on the surface of the strip-shaped body is projected on the screen; an imaging unit configured to image the reflected light of the linear light projected on the screen; and an arithmetic processing unit configured to acquire the amount of warpage in a width direction of the strip-shaped body on the basis of a line length of the reflected light of the linear light imaged by the imaging unit.

The light source may irradiate the surface of the strip-shaped body with the linear light of a wavelength of not less than 200 nm and not more than 1700 nm at the angle of incidence of not less than 74° and not more than 88°. A line width of the linear light along a longitudinal direction of the strip-shaped body on the surface of the strip-shaped body may be set to 2 mm or less.

The light source may be installed so as to apply linear light diagonally with respect to the surface of the strip-shaped body from the upstream side or the downstream side in the movement direction of the strip-shaped body. Alternatively, the light source may be installed so as to apply linear light to the surface of the strip-shaped body from the line side of a line on which the strip-shaped body moves.

The arithmetic processing unit may include a screen image length acquisition unit configured to acquire a line length of a screen image that is reflected light of the strip-shaped body included in a captured image acquired by the imaging unit, and a warpage calculation unit configured to calculate, on the basis of the line length of the screen image acquired by the screen image length acquisition unit, the amount of warpage in the width direction of the strip-shaped body from a relationship between a line length of reflected light of the strip-shaped body and the amount of warpage in the width direction of the strip-shaped body acquired in advance.

The light source may be installed to be rotated around an optical axis of the light source by a prescribed angle.

When the light source is installed to be rotated around an optical axis of the light source by a prescribed angle, the arithmetic processing unit may include a screen image length acquisition unit configured to acquire a line length of a screen image that is reflected light of the strip-shaped body included in a captured image acquired by the imaging unit, and a warpage calculation unit configured to calculate, on the basis of the line length of the screen image acquired by the screen image length acquisition unit, the amount of warpage in the width direction of the strip-shaped body from a relationship between a line length of reflected light of the strip-shaped body and the amount of warpage in the width direction of the strip-shaped body acquired in advance. The warpage calculation unit may identify the amount of warpage of the strip-shaped body on the basis of the relationship between a line length of reflected light of the strip-shaped body and, the amount of warpage in the width direction of the strip-shaped body acquired in advance, and an inclination of the screen image in the captured image acquired by the imaging unit.

In order to solve the above problem, according to another aspect of the present invention, there is provided a shape measurement method including: a first step of using a light source to irradiate a surface of a moving strip-shaped body with linear light at a prescribed angle of incidence, and using an imaging unit to image a screen on which reflected light of the linear light on the surface of the strip-shaped body is projected and acquiring a captured image in which a screen image that is reflected light of the strip-shaped body is included; and a second step of acquiring the amount of warpage in a width direction of the strip-shaped body on the basis of a line length of the screen image included in the captured image.

Advantageous Effects of Invention

As described above, according to the present invention, the amount of warpage in the width direction of a strip-shaped body can be measured with higher sensitivity.

BRIEF DESCRIPTION OF DRAWINGS

FIG. 10 is an explanatory diagram describing shape changes of a screen image in accordance with the warpage in the width direction of a strip-shaped body.

FIG. 15 is an explanatory diagram describing the state of linear light applied to the surface of a strip-shaped body when the linear light source is rotated around the optical axis.

FIG. 18 is an explanatory diagram describing a change of a screen image when the linear light source is provided with a turn angle around the optical axis.

DESCRIPTION OF EMBODIMENTS

Figure 1:
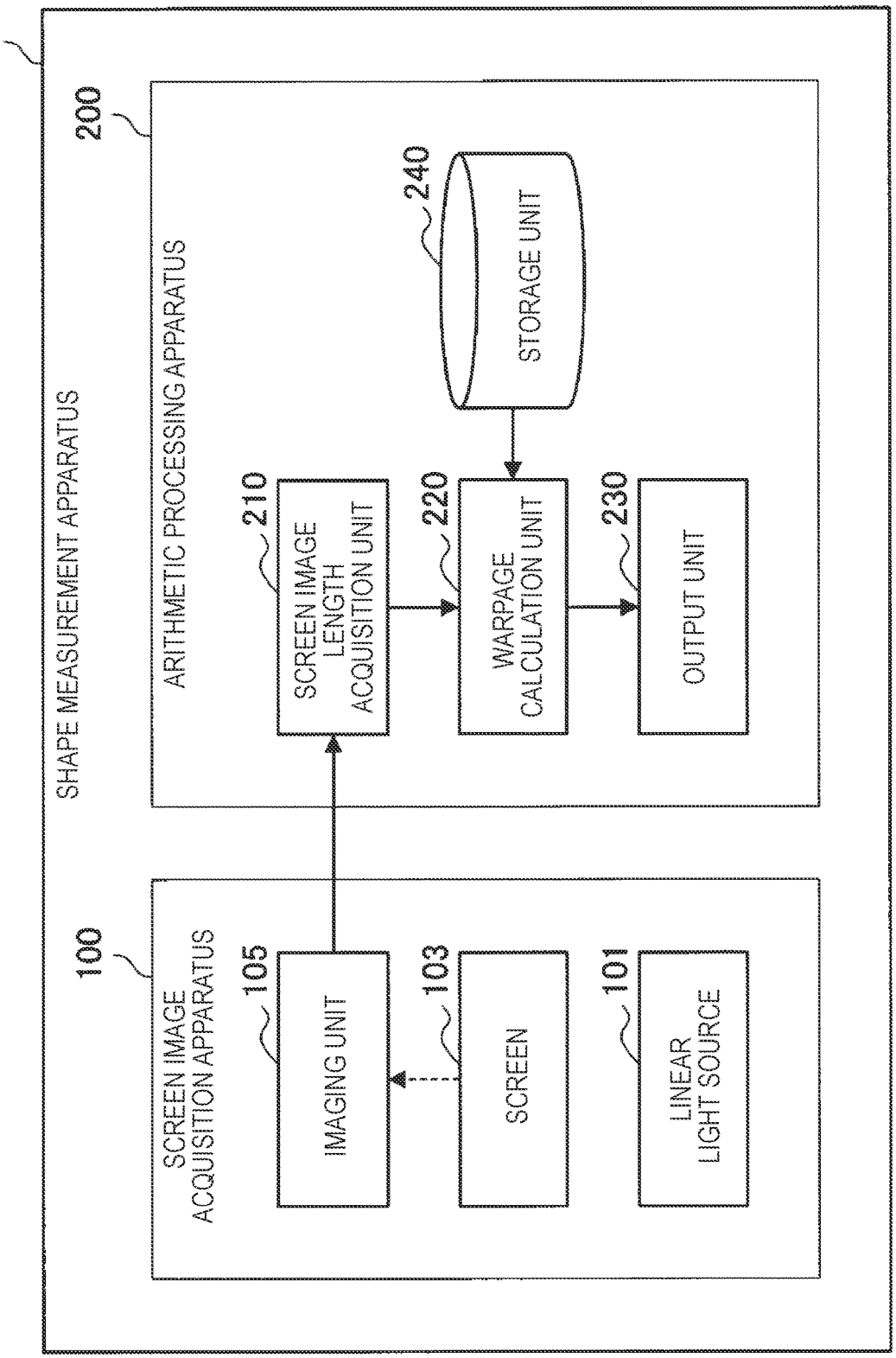
FIG. 1 is a block diagram showing a rough configuration of a shape measurement apparatus according to an embodiment of the present invention.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

(1. Rough Configuration of Shape Measurement Apparatus)

Figure 2:
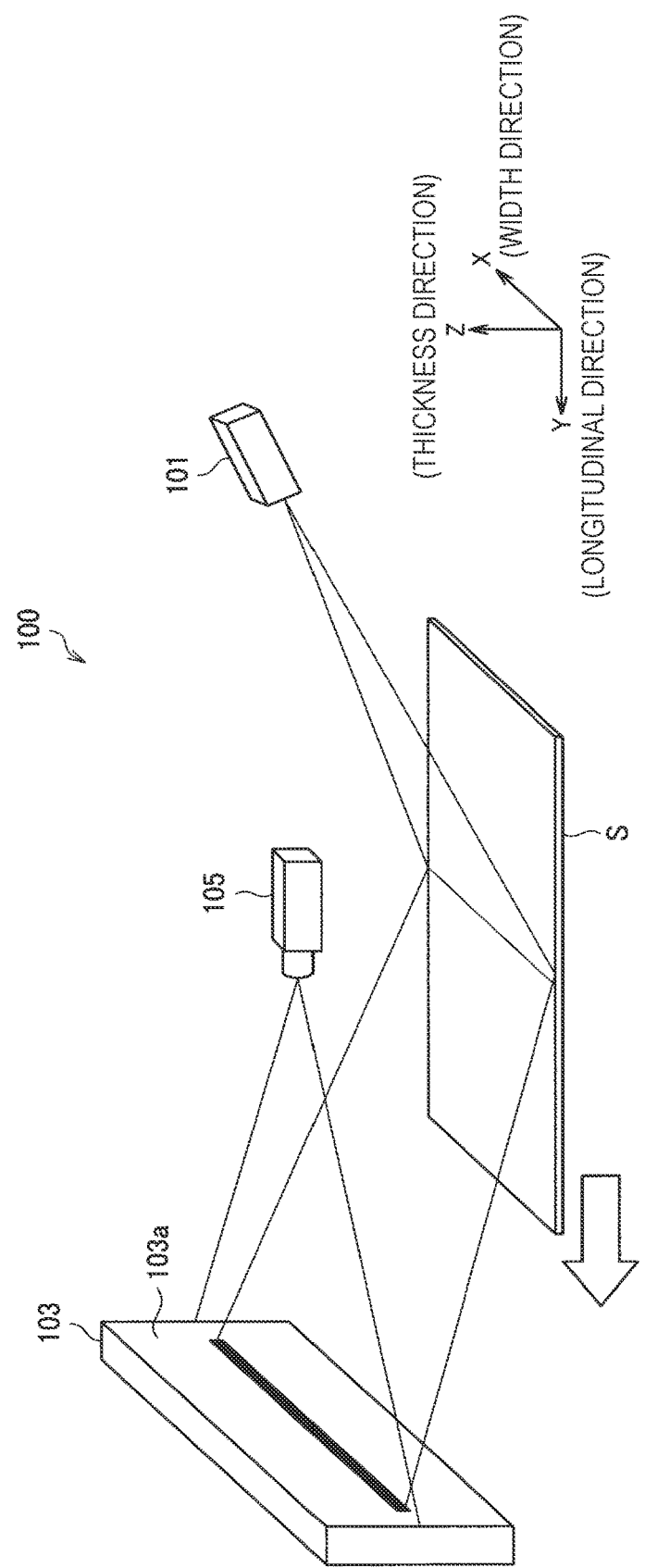
FIG. 2 is an explanatory diagram schematically showing an example of the configuration of a screen image acquisition apparatus of the shape measurement apparatus according to the embodiment.
Figure 3:
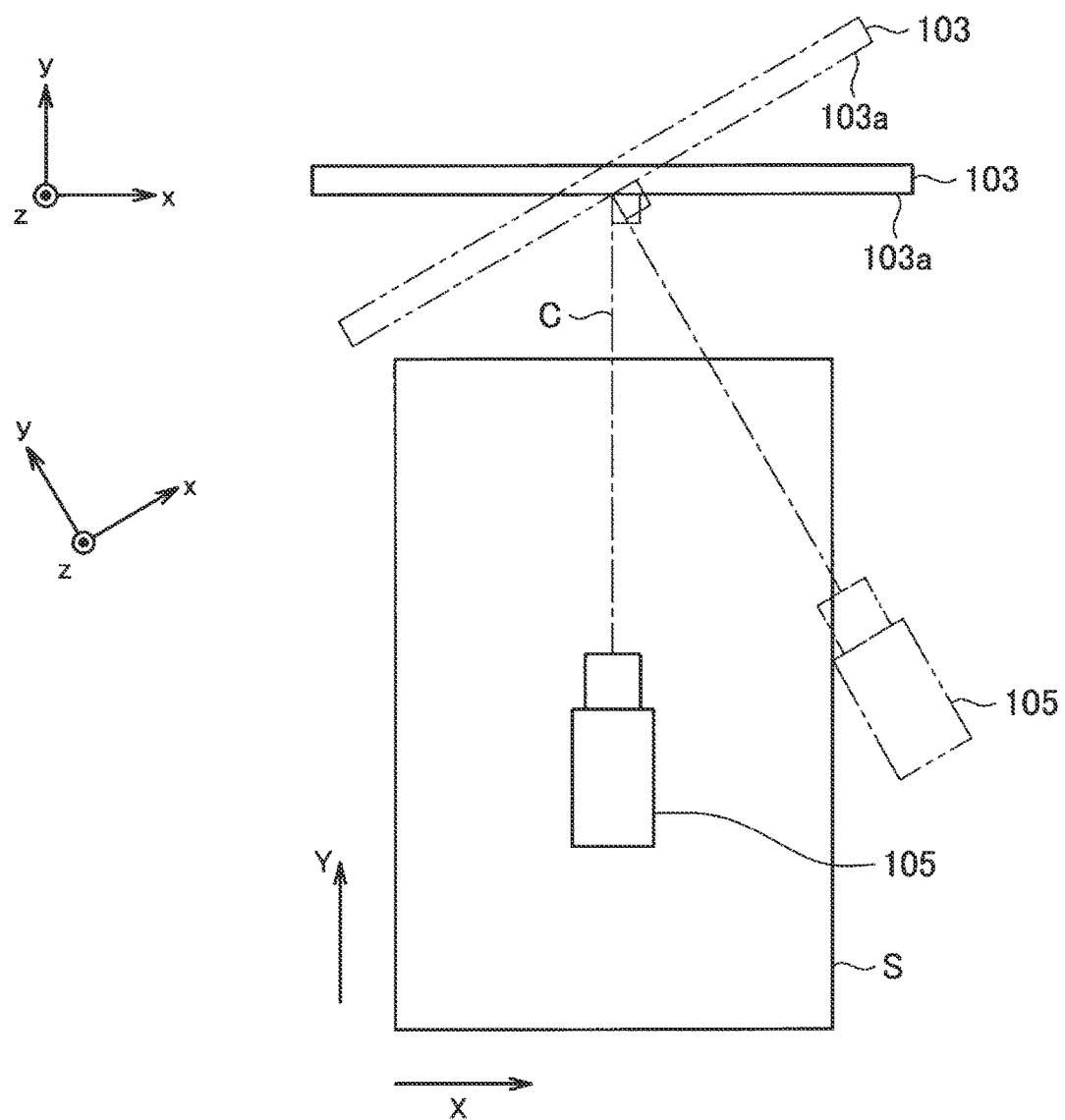
FIG. 3 is a plan view schematically showing a positional relationship between a screen and an imaging unit.
Figure 4:
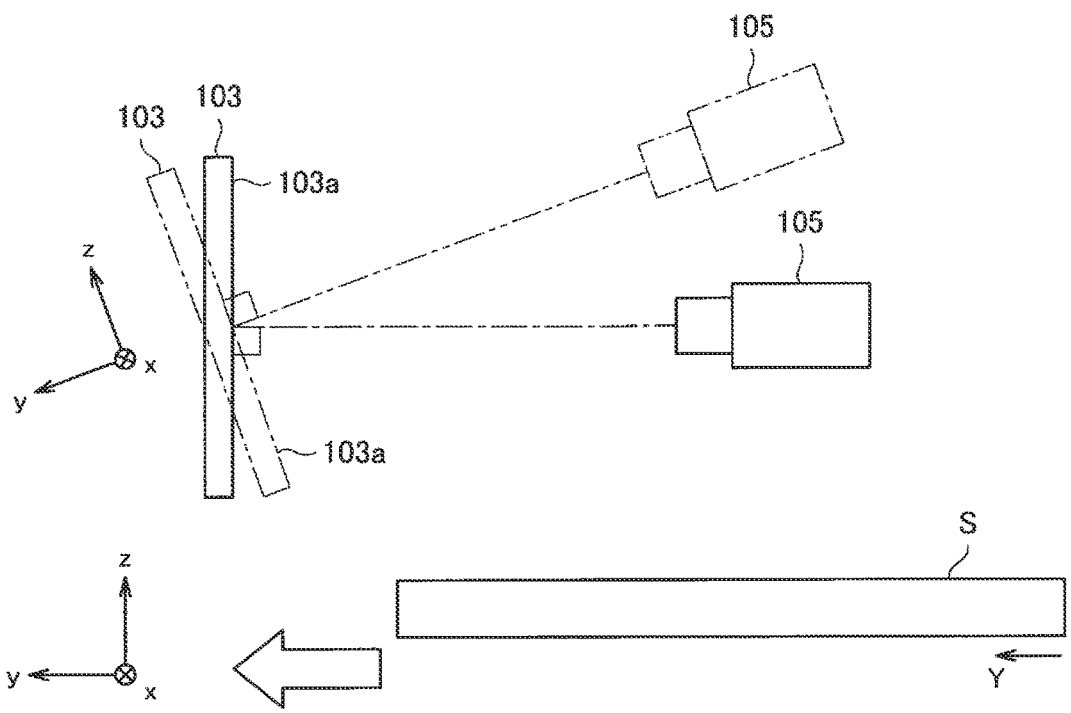
FIG. 4 is a side view schematically showing a positional relationship between the screen and the imaging unit.
Figure 5:
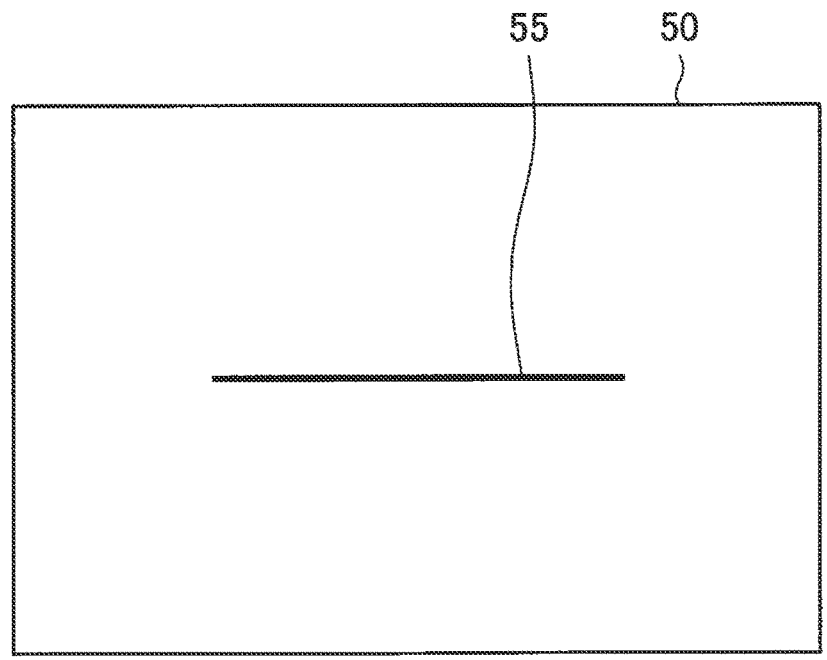
FIG. 5 is an explanatory diagram showing an example of a captured image including a screen image obtained by the imaging unit.

First, a rough configuration of a shape measurement apparatus 10 according to an embodiment of the present invention is described with reference to FIG. 1 to FIG. 5. FIG. 1 is a block diagram showing a rough configuration of the shape measurement apparatus 10 according to an embodiment of the present invention. FIG. 2 is an explanatory diagram schematically showing an example of the configuration of a screen image acquisition apparatus 100 of the shape measurement apparatus 10 according to the embodiment. FIG. 3 is a plan view schematically showing a positional relationship between a screen 103 and an imaging unit 105. FIG. 4 is a side view schematically showing a positional relationship between the screen 103 and the imaging unit 105. FIG. 5 is an explanatory diagram showing an example of a captured image 50 including a screen image 55 obtained by the imaging unit.

The shape measurement apparatus 10 according to an embodiment of the present invention is an apparatus that applies linear illumination light to the surface of a strip-shaped body such as a moving steel plate, images a screen on which the reflected light of the illumination light reflected on the surface of the strip-shaped body is projected, and analyses the captured image to measure the surface shape of the strip-shaped body. As shown in FIG. 1, the shape measurement apparatus 10 is composed of a screen image acquisition apparatus 100 and an arithmetic processing apparatus 200.

(1-1. Screen Image Acquisition Apparatus)

The screen image acquisition apparatus 100 successively captures images of the surface of a strip-shaped body moving on the conveyance line along the longitudinal direction of the strip-shaped body (that is, the movement direction), and outputs the obtained captured images to the arithmetic processing apparatus 200. As shown in FIG. 1, the screen image acquisition apparatus 100 includes a linear light source 101, a screen 103, and an imaging unit 105. The linear light source 101 applies linear illumination light to the surface of a strip-shaped body such as a moving steel plate. On the screen 103, the reflected light of illumination light that is generated by the linear illumination light applied from the linear light source 101 being reflected on the surface of the strip-shaped body is projected. The imaging unit 105 images the screen 103, and acquires a captured image that includes the reflected light of illumination light projected on the screen 103 as a screen image.

The linear light source 101, the screen 103, and the imaging unit 105 constituting the screen image acquisition apparatus 100 are, for example as shown in FIG. 2 to FIG. 4, installed above a line on which a strip-shaped body S is conveyed.

The linear light source 101 applies linear light to the surface of the strip-shaped body S moving on the conveyance line. The linear light source 101 like this may be configured by, for example, combining a light source unit such as a continuous wave (CW) laser light source that makes continuous oscillation, a super luminescent diode (SLD) light source, or a light emitting diode (LED) light source and a lens unit such as a rod lens. For the linear light source 101, the light emitted from the light source unit is spread in a circular sectorial plane toward the surface of the strip-shaped body S by the lens unit. Thus, the light applied from the linear light source 101 to the surface of the strip-shaped body S forms a linear shape. In the present invention, it is sufficient that the linear light source 101 be a light source of which the emitted light spreads in a circular sectorial form, and the lens unit may also use a lens other than a rod lens, such as a cylindrical lens or a Powell lens.

A detailed description of the setting of the linear light source 101 is given later. In the example shown in FIG. 2, the linear light source 101 irradiates the strip-shaped body S with linear light extending in the width direction of the strip-shaped body S from the upstream side in the movement direction of the strip-shaped body S (the Y-direction); but the present invention is not limited to this example. For example, as described later, linear light extending in the width direction of the strip-shaped body S may be applied from the downstream side in the movement direction of the strip-shaped body S (the Y-direction), or linear light may be applied diagonally with respect to the surface of the strip-shaped body S from the line side of the conveyance line of the strip-shaped body S.

As shown in FIG. 2, the screen 103 is provided in a position facing the linear light source 101, and the reflected light of linear light reflected by the surface of the strip-shaped body S is projected on the screen 103. The breadth of the screen 103 has a width that makes it possible to project reflected light spanning the entire width of the strip-shaped body S, in accordance with the angle of spread of linear light and the projection distance to the screen. The height of the screen 103 is set so that reflected light is present on the projection surface of the screen 103 even when the projection position of reflected light is changed due to the shape of the strip-shaped body S, vibration occurring in association with the movement of the strip-shaped body S, a change in the thickness of the strip-shaped body S, etc.

As shown in FIG. 2, the imaging unit 105 is provided in a position facing the screen 103 and allowing the screen 103 to be imaged. An area camera is used as the imaging unit 105. The area camera includes a lens having a prescribed focal distance and an imaging element such as a charge-coupled device (CCD) or a complementary metal oxide semiconductor (CMOS). The imaging unit 105 images the projection surface 103a of the screen 103 on which the reflected light of linear light from the surface of the strip-shaped body S is projected, and generates a captured image. The reflected light of linear light from the surface of the strip-shaped body S projected on the projection surface 103a of the screen 103 may be referred to as a screen image.

In the imaging unit 105, the area to be imaged, is adjusted in advance with reference to operation data in the past etc. so that the reflected light of linear light projected on the screen 103 is included in the visual field, and setting is made so that the projection surface of the screen 103 is imaged under the same imaging conditions. Here, an x-y-z coordinate system fixed to the imaging unit 105 like that shown in FIG. 3 and FIG. 4 is defined. In the coordinate system, the width direction of the imaging visual field of the imaging unit 105 is defined as the x-axis direction, the optical axis direction of the imaging unit 105 is defined as the y-axis direction, and the height direction of the imaging visual field of the imaging unit 105 is defined as the z-axis direction.

As shown in FIG. 3 and FIG. 4, the screen 103 is placed such that the normal vector of the projection surface expressed by the x-y-z coordinate system does not have an x-component (in other words, the value of the x-component is zero). That is, the positional relationship mentioned above may be satisfied in a state where, as shown by the solid line in the planar view shown in FIG. 3, the optical axis direction of the imaging unit 105 (the y-axis) and the movement direction of the strip-shaped body S (the Y-axis) are parallel. Alternatively, as shown by the alternate long and two short dashes line in FIG. 3, a state where the screen 103 and the imaging unit 105 are rotated around the z-axis from the state shown by the solid line while satisfying the positional relationship mentioned above is possible. Thereby, the image resolution along the width direction can be equalized in the visual field of the imaging unit 105.

Since it is sufficient that the image resolution along the width direction be equalized, the positional relationship between the screen 103 and the imaging unit 105 may be, for example as shown by the solid line in the side view shown in FIG. 4, a positional relationship in which the optical axis C of the imaging unit 105 is orthogonal to the projection surface 103a of the screen 103 in a state where the optical axis direction of the imaging unit 105 (the y-axis) and the movement direction of the strip-shaped body S (the Y-axis) are parallel. Alternatively, as shown by the alternate long and two short dashes line in FIG. 4, a state where the screen 103 and the imaging unit 105 are rotated around the x-axis from the state shown by the solid line while satisfying the positional relationship mentioned above is possible. Thereby, the image resolution along the width direction can be equalized in the visual field of the imaging unit 105. Further, in FIG. 4, since the image resolution along the width direction is equalized, either one of the screen 103 and the imaging unit 105 may be placed in the position shown by the solid line, and the other may be placed in the position shown by the alternate long and two short dashes line.

The captured image acquired by the imaging unit 105 thus installed is, for example as shown in FIG. 5, an image in which the reflected light of linear light (that is, the screen image) 55 appears in the image size of a full frame. The imaging unit 105 outputs the acquired captured image to the arithmetic processing apparatus 200.

The screen image acquisition apparatus 100 described above may be controlled by, for example, the arithmetic processing apparatus 200. In general, the conveyance line that conveys the strip-shaped body S, which is the measurement object, is provided with a pulse logic generator (PLG, a pulse-type speed detector) or the like in order to detect the moving speed of the strip-shaped body S, for example. Thus, on the basis of a PLG signal of one pulse inputted from the PLG, the arithmetic processing apparatus 200 transmits a control signal to the imaging unit 105 of the screen image acquisition apparatus 100 at regular intervals, and can cause the imaging unit 105 to work, with the control signal as the imaging timing. Thus, the reflected light of linear light projected on the screen 103 is imaged every time the strip-shaped body S moves a prescribed distance, and a captured image can be acquired at regular intervals.

(1-2. Arithmetic Processing Apparatus)

The arithmetic processing apparatus 200 analyzes the captured image acquired by the screen image acquisition apparatus 100, and calculates the amount of warpage in the width direction of the strip-shaped body. As shown in FIG. 1, the arithmetic processing apparatus 200 includes a screen image length acquisition unit 210, a warpage calculation unit 220, an output unit 230, and a storage unit 240.

On the basis of the captured image acquired by the imaging unit 105 of the screen image acquisition apparatus 100, the screen image length acquisition unit 210 acquires the line length of the reflected light of the linear light applied to the strip-shaped body S included in the captured image (the screen image). The screen image length acquisition unit 210 is configured with, for example, a central processing unit (CPU), a read-only memory (ROM), a random access memory (RAM), a communication device, etc. In the shape measurement apparatus 10 according to the present embodiment, the amount of warpage in the width direction of the strip-shaped body S is acquired on the basis of the line length of the screen image. The line length of the screen image can be acquired by the image analysis of the captured image.

Here, the line length of the screen image refers to the length of the screen image in the captured image traced from one end point to the other end point of the screen image. For example, in the case where, as shown in FIG. 2, the linear light emitted from the linear light source 101 is applied to the surface of the strip-shaped body S from the upstream side in the movement direction of the strip-shaped body S, the line length of the screen image is the length of the screen image traced along a direction corresponding to the width direction of the strip-shaped body S (the X-direction). Also in the case where, for example described later, the linear light emitted from the linear light source 101 is applied to the surface of the strip-shaped body S from the line side of the conveyance line, the above applies similarly, and the line length of the screen image is the length of the screen image traced along a direction corresponding to the width direction of the strip-shaped body S (the X-direction).

The screen image length acquisition unit 210 identifies the reflected light of the linear light applied to the strip-shaped body S included in the captured image (the screen image) on the basis of, for example, the luminance value of each pixel of the captured image. Then, the screen image length acquisition unit 210 calculates the value obtained by dividing the number of pixels of the area identified as the screen image by the line width of the screen image and thereby acquires the line length of the screen image, and outputs the line length to the warpage calculation unit 220.

On the basis of the line length of the screen image inputted from the screen image length acquisition unit 210, the warpage calculation unit 220 calculates the amount of warpage in the width direction of the strip-shaped body S. The warpage calculation unit 220 is configured with, for example, a CPU, a ROM, a RAM, a communication device, etc. The warpage calculation unit 220 refers to the relationship between the line length of the reflected light of the strip-shaped body S and the amount of warpage in the width direction of the strip-shaped body S stored in the storage unit 240, and acquires the amount of warpage in the width direction of the strip-shaped body S that corresponds to the line length of the screen image acquired by the screen image length acquisition unit 210. In the case where the captured image is an image obtained by imaging the reflected light of the linear light emitted from a linear light source 101 that is installed with a prescribed turn angle with respect to the optical axis, the warpage calculation unit 220 can identify the direction of the warpage of the strip-shaped body S in accordance with the inclination of the screen image. The information on the warpage in the width direction of the strip-shaped body S acquired by the warpage calculation unit 220 is outputted to the output unit 230.

The output unit 230 outputs the information on the warpage in the width direction of the strip-shaped body S acquired by the warpage calculation unit 220 to a display device, a storage device, and other devices (all of these not illustrated). The output unit 230 is configured with, for example, a CPU, a ROM, a RAM, a communication device, etc.

The storage unit 240 is an example of the storage device included in the arithmetic processing apparatus 200, and is configured with, for example, a ROM, a RAM, a storage device, etc. The storage unit 240 stores information used to acquire information on the warpage in the width direction of the strip-shaped body S. For example, the storage unit 240 stores the relationship between the line length of the reflected light of the strip-shaped body S and the amount of warpage in the width direction of the strip-shaped body S acquired in advance. The storage unit 240 may be caused to store the relationship between the inclination of the screen image and the direction of the warpage of the strip-shaped body S acquired in advance.

The arithmetic processing apparatus 200 according to the present embodiment may be configured to be capable of controlling the imaging processing that is performed by the screen image acquisition apparatus 100 and that captures the screen image, which is the reflected light of linear light on the surface of the strip-shaped body S. In this case, the arithmetic processing apparatus 200 may include, for example, an imaging control unit (not illustrated) that performs the control of the light emission of the linear light source 101, the control of the imaging of the imaging unit 105, etc. The imaging control unit is configured with, for example, a CPU, a ROM, a RAM, a communication device, etc.

(2. Shape Measurement Method)

A shape measurement method that measures the state of the warpage in the width direction of the strip-shaped body S using the shape measurement apparatus 10 described above will now be described in detail.

(2-1. First Embodiment: Linear Light Irradiation from Upstream Side in Movement Direction of Strip-Shaped Body)

Figure 6:
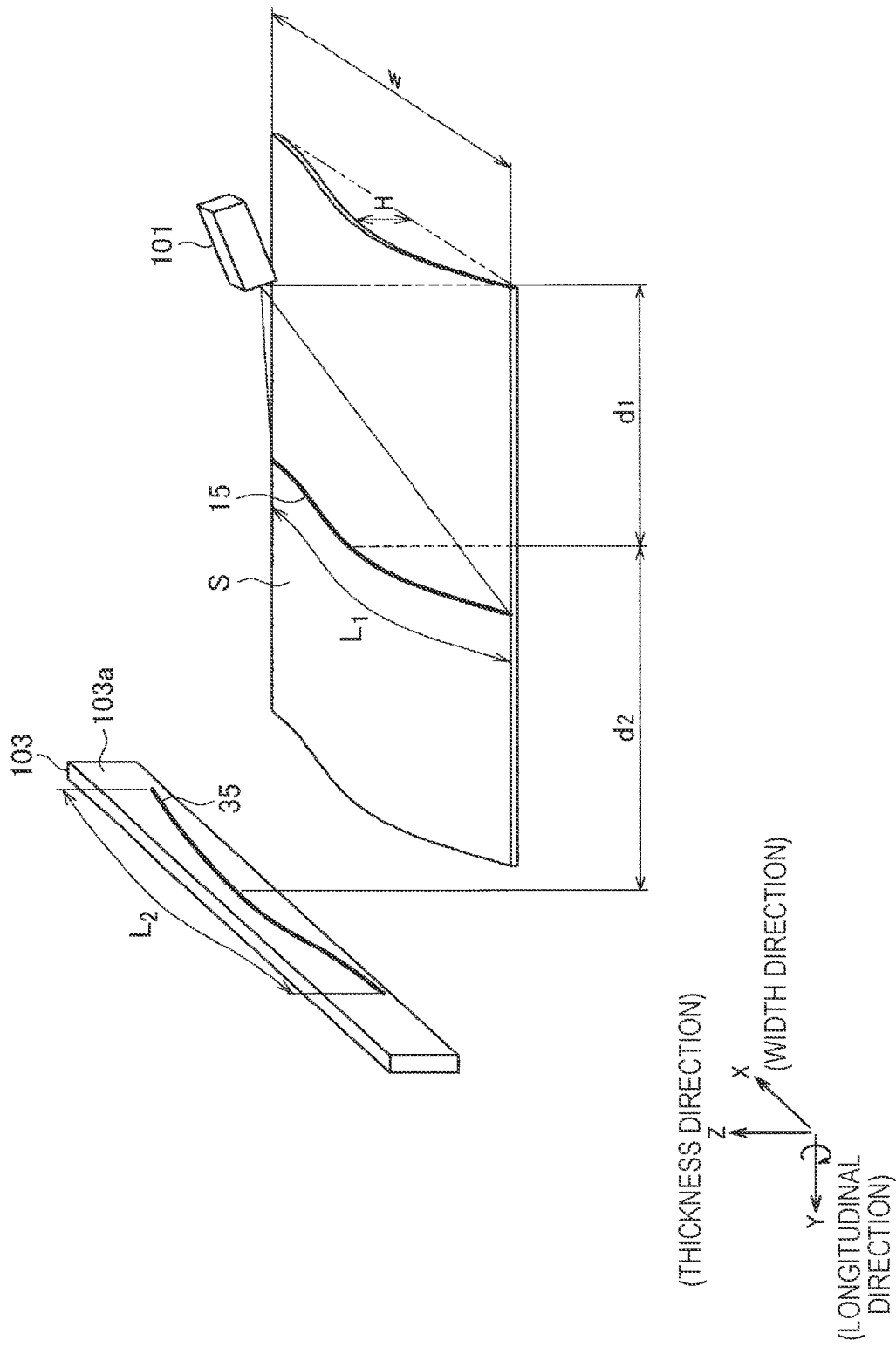
FIG. 6 is an explanatory diagram showing an example of the configuration of a screen image acquisition apparatus of a shape measurement apparatus according to a first embodiment of the present invention.
Figure 7:
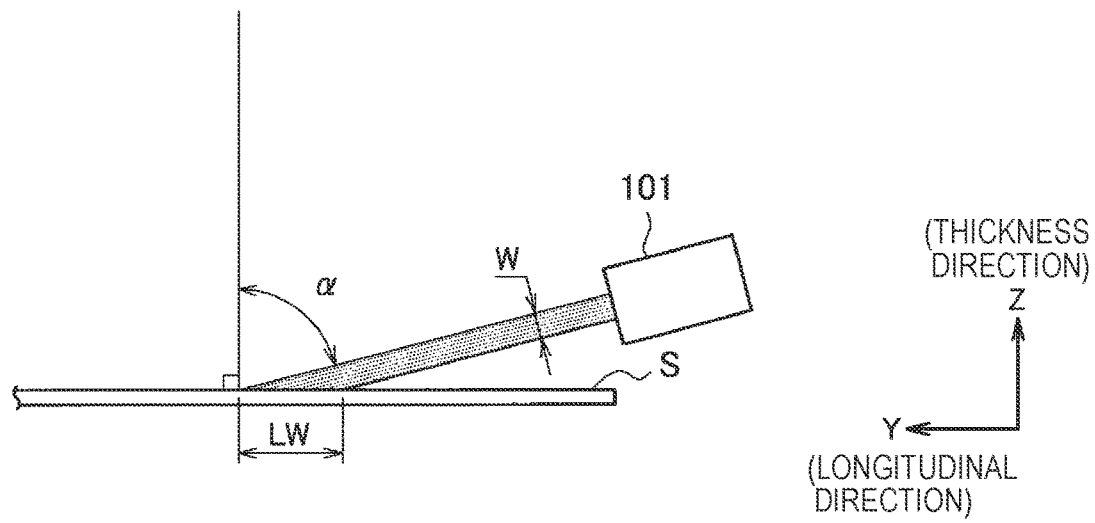
FIG. 7 is an explanatory diagram describing the angle of incidence of a linear light source.
Figure 8:
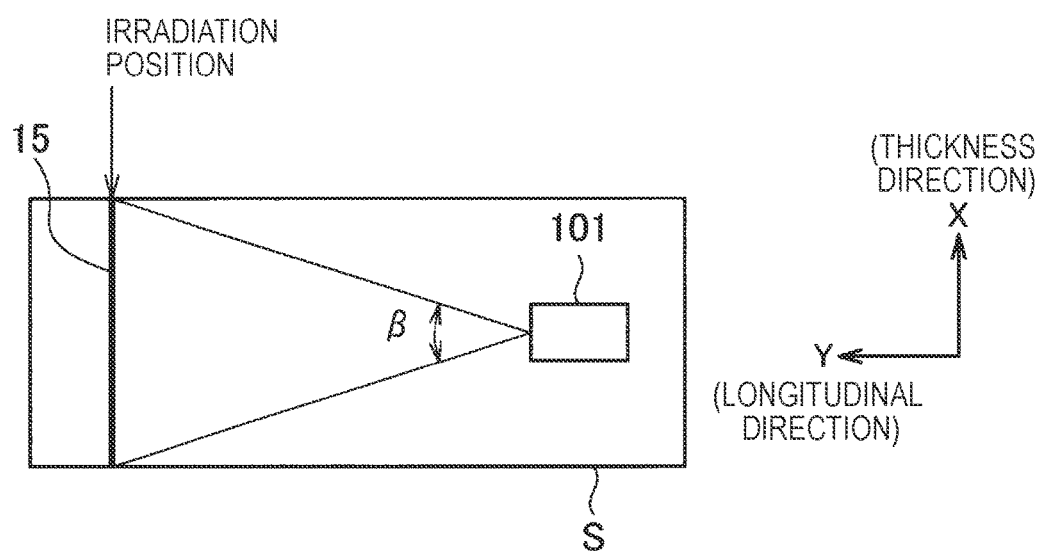
FIG. 8 is an explanatory diagram describing the angle of spread of the linear light source.
Figure 9:
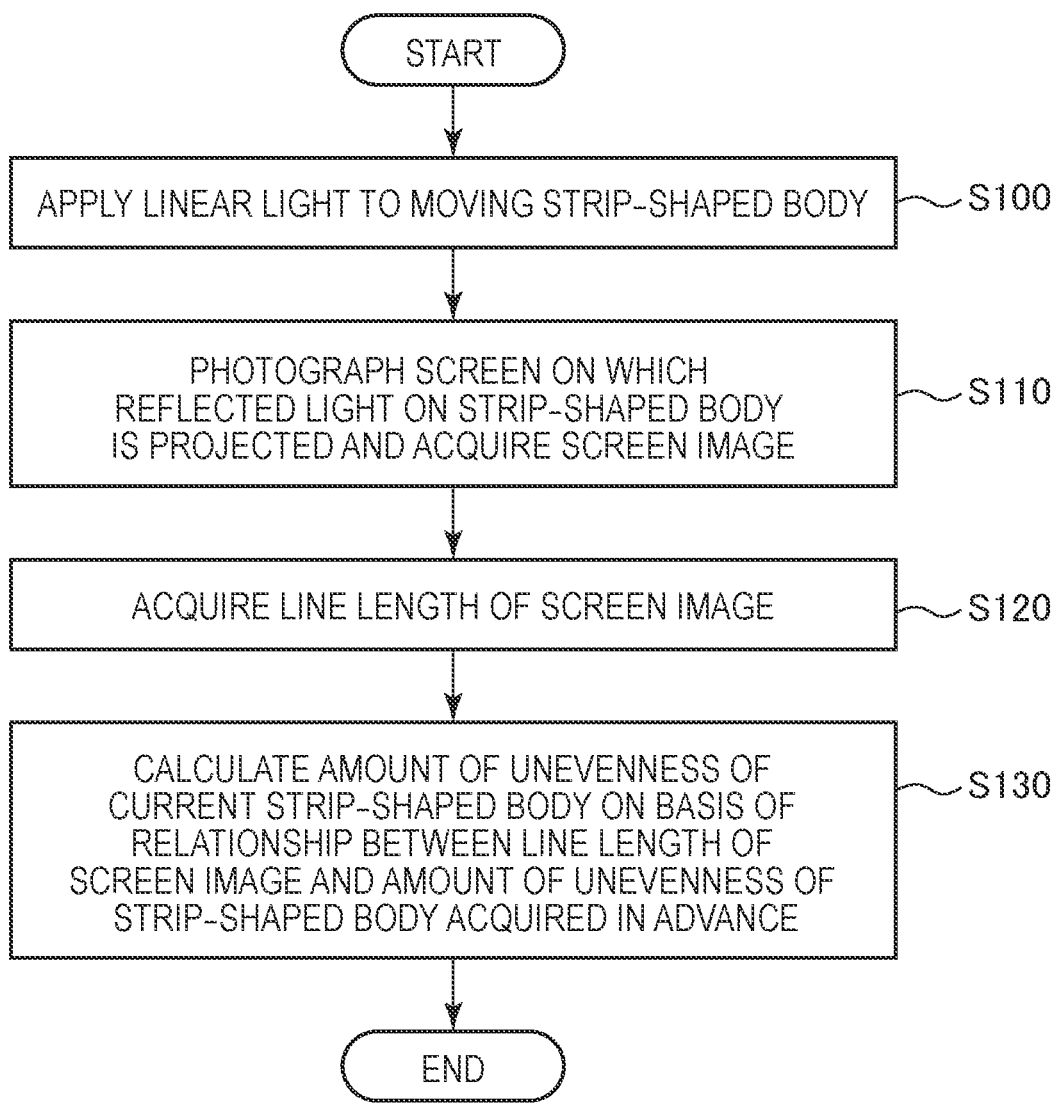
FIG. 9 is a flow chart showing a shape measurement method according to the embodiment.
Figure 11:
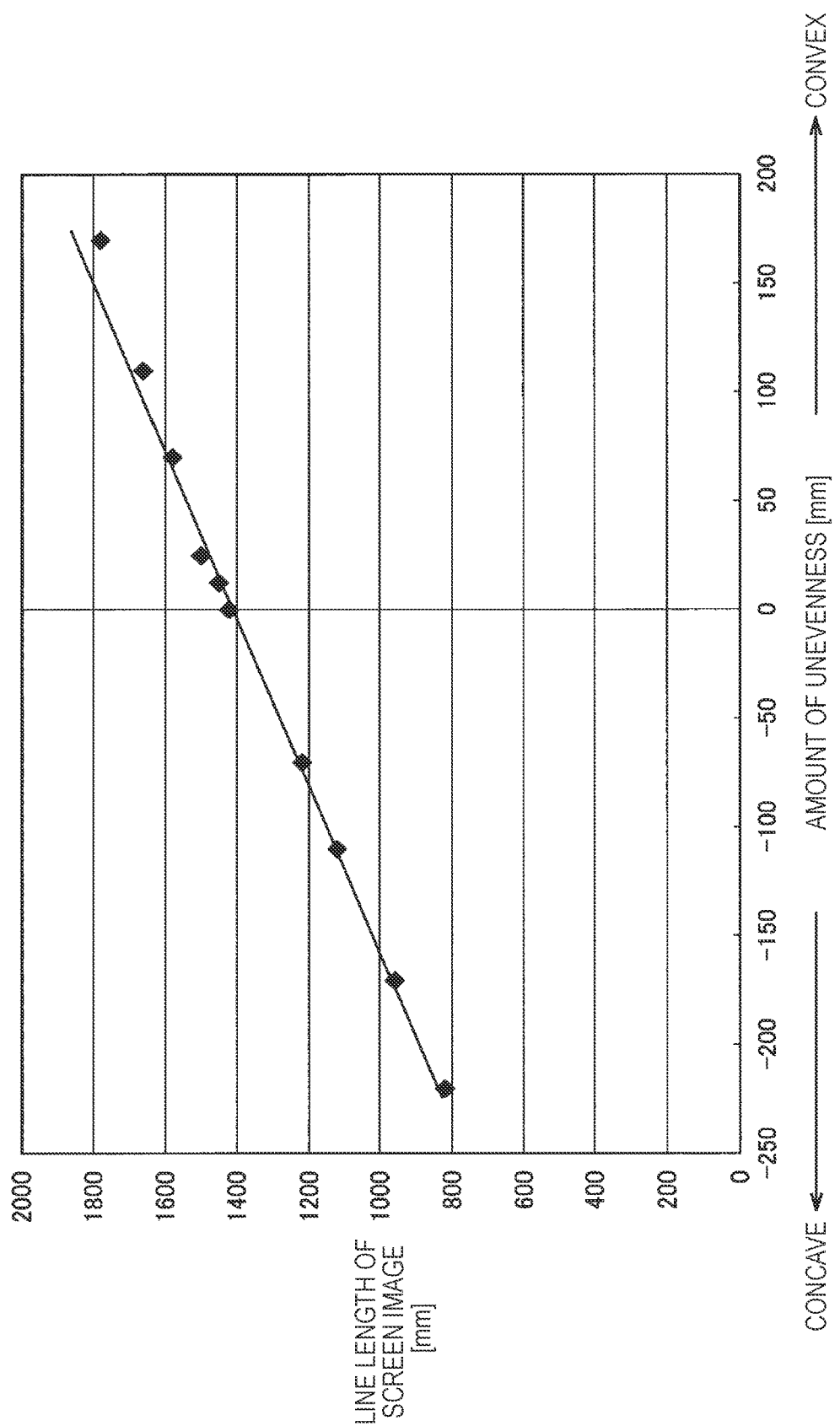
FIG. 11 is a graph showing an example of the relationship between the amount of warpage (the amount of unevenness) in the width direction of a strip-shaped body and the length of a screen image.

First, a shape measurement method according to a first embodiment that measures the state of the warpage in the width direction of the strip-shaped body S is described on the basis of FIG. 6 to FIG. 11. FIG. 6 is an explanatory diagram showing an example of the configuration of the screen image acquisition apparatus 100 of the shape measurement apparatus 10 according to the present embodiment. FIG. 7 is an explanatory diagram describing the angle of incidence of the linear light source 101. FIG. 8 is an explanatory diagram describing the angle of spread of the linear light source 101 according to the present embodiment. FIG. 9 is a flow chart showing a shape measurement method according to the present embodiment. FIG. 10 is an explanatory diagram describing shape changes of a screen image in accordance with the warpage in the width direction of a strip-shaped body. FIG. 11 is a graph showing an example of the relationship between the amount of warpage (the amount of unevenness) in the width direction of the strip-shaped body S and the length of the screen image.

In the present embodiment, a shape measurement method in the case where linear light is applied to the surface of the strip-shaped body S from the upstream side in the movement direction of the strip-shaped body S is described. As shown in FIG. 6, in the screen image acquisition apparatus 100 of the shape measurement apparatus 10 according to the present embodiment, the linear light source 101 is placed on the upstream side in the movement direction of the strip-shaped body S, and the screen 103 is placed on the downstream side in the movement direction of the strip-shaped body S with respect to the linear light source 101 so as to face the linear light source 101. The angle of incidence of linear light emitted from the linear light source 101, the wavelength of linear light, and the line width on the surface of the strip-shaped body are set in the following manner. It is also possible for the linear light source 101 to be placed on the downstream side in the movement direction of the strip-shaped body S, and for the screen 103 to be placed on the upstream side in the movement direction of the strip-shaped body S with respect to the linear light source 101 so as to face the linear light source 101. Also in this case, the description shown below holds similarly.

First, as shown in FIG. 7, the angle $\alpha$ between the optical axis of the linear light source 101 and the direction normal to the surface of the strip-shaped body S (the Z-axis direction) is defined as the angle of incidence $\alpha$ of linear light. It is assumed that the linear light applied from the linear light source 101 has a finite line width W as schematically shown in FIG. 7. Further, it is assumed that, when linear light with a line width of W is incident on the surface of the strip-shaped body S at an angle of incidence $\alpha$, the line width W of the linear light becomes a line width of LW on the surface of the strip-shaped body S.

[Wavelength (Upper Limit) of Linear Light]

First, the upper limit value of the wavelength of linear light applied from the linear light source 101 to the surface of the strip-shaped body S is prescribed in accordance with the properties of the imaging element installed in the imaging unit 105. An imaging element such as a CCD or a CMOS commonly used is formed using a semiconductor material such as Si or InGaAs; in general, these semiconductor materials cannot detect light of wavelengths more than 1700 nm. Hence, the upper limit value of the wavelength of linear light applied from the linear light source 101 to the surface of the strip-shaped body S according to the present embodiment is preferably set to 1700 nm.

[Angle of Incidence (Upper Limit) of Linear Light and Line Width (Upper Limit) on Surface of Strip-Shaped Body]

Next, the line width LW on the surface of the strip-shaped body S schematically shown in FIG. 7 is set in accordance with what degree of measurement pitch the amount of warpage is intended to be measured with along the movement direction. It is generally required that the measurement pitch along the movement direction of the amount of warpage that is focused on in the shape measurement apparatus 10 according to the present embodiment be 2 mm or less, in operational terms. Hence, it is preferable that the maximum value of the line width LW of linear light on the surface of the strip-shaped body S be 2 mm.

At present, the lower limit value of the line width W of beams of light that are industrially feasible in practical terms in a wavelength band like that focused on in the present invention is approximately 70 μm. Hence, to achieve a line width LW of 2 mm on the surface of the strip-shaped body S, the angle of incidence $\alpha$ is approximately 88°, which is derived from arccos(70 μm/2000 μm). Further, as is clear from the geometrical relationship shown in FIG. 7, when the angle of incidence $\alpha$ is more than 88°, the line width LW is more than 2 mm. Therefore, in the screen image acquisition apparatus 100 according to the present embodiment, the upper limit value of the allowable angle of incidence $\alpha$ of linear light is preferably set to 88°.

[Angle of Incidence (Lower Limit) of Linear Light and Wavelength (Lower Limit) of Linear Light]

Although details are described later, the angle of incidence $\alpha$ is set so that the linear light emitted from the linear light source 101 is specularly reflected on the surface of the strip-shaped body S. The influence on the specularity of the surface of the measurement object due to the surface roughness of the measurement object and the wavelength of light used for measurement can be discussed on the basis of parameter g expressed by Formula 1 below, as described in Non-Patent Literature 1 above.

[Math. 1]

$$g = \left(\frac{4\pi\sigma}{\lambda}\cos\theta\right)^2 \quad \text{(Formula 1)}$$

In Formula 1 above,

σ: the standard deviation of unevenness on the surface of the measurement object [μm], θ: the angle of incidence [°], and λ: the wavelength of light used for measurement [μm].

It is known that, in the case where parameter g expressed by Formula 1 above is larger than 1, the amount of diffuse reflection components increases steeply. Thus, in order that linear light may be specularly reflected on the surface of the strip-shaped body S in the screen image acquisition apparatus 100 according to the present embodiment, parameter g is preferably 1 or less. For example, in the case of a metallic body with a standard deviation a of approximately 0.5 μm, which is typified by a steel product, in order to cause linear light to be specularly reflected on the surface of the strip-shaped body S, it is preferable that the angle of incidence θ and the wavelength λ of linear light satisfy Formula 2 below.

[Math. 2]

$$\frac{\cos\theta}{\lambda} \leq \frac{1}{2\pi} \approx 0.16 \quad \text{(Formula 2)}$$

In the case where the angle of incidence $\alpha$ is the upper limit value of 88°, the wavelength by which parameter g being 1 or less is guaranteed is approximately 200 nm from Formula 2 above. Therefore, in the screen image acquisition apparatus 100 according to the present embodiment, the lower limit of the wavelength of linear light is preferably set to 200 nm. On the other hand, at 1700 nm, which is the upper limit value of the wavelength of linear light, the lower limit value of the angle of incidence $\alpha$ by which parameter g being 1 or less is guaranteed is approximately 74° from Formula 2 above. Therefore, in the case of using an imaging unit such as an area camera including an imaging element such as a common CCD or CMOS, the angle of incidence $\alpha$ is preferably set to 74° or more.

The angle of spread $\beta$ of linear light emitted from the linear light source 101 shown in FIG. 8 is set so that the entire width direction of the strip-shaped body S is irradiated with linear light.

In the shape measurement method executed using the screen image acquisition apparatus 100 like this, first, linear light is applied from the linear light source 101 to the surface of the strip-shaped body S moving on the conveyance line as shown in FIG. 9 (S100). When light is emitted from the linear light source 101, the surface of the strip-shaped body S is irradiated with linear light as shown in FIG. 6. Then, the reflected light of the linear light reflected on the surface of the strip-shaped body S is projected as a screen image 35 on the projection surface 103a of the screen 103.

Next, the imaging unit 105 images the screen 103 on which the reflected light of the linear light reflected on the surface of the strip-shaped body S is projected, and acquires a captured image including the screen image 35 (S110). Here, the screen image 35 projected on the screen 103 changes with the shape of the warpage in the width direction of the strip-shaped body S.

For example, as shown in FIG. 10, in the state of downward warpage in which a central portion in the width direction of the strip-shaped body S is convex downward, the line length $L_2$ of the screen image 35 that is the projection on the screen 103 of the reflected light of the linear light 15 applied to the surface of the strip-shaped body S is shorter than the line length of a screen image 35f obtained when the strip-shaped body S is flat, that is, has no warpage, due to the action of the concave mirror. On the other hand, in the state of upward warpage in which a central portion in the width direction of the strip-shaped body S is convex upward, the line length $L_2$ of the screen image 35 that is the projection on the screen 103 of the reflected light of the linear light 15 applied to the surface of the strip-shaped body S is longer than the line length of a screen image 35f obtained when the strip-shaped body S is flat, that is, has no warpage, due to the action of the convex mirror. The shape measurement method according to the present embodiment uses these characteristics, and thereby acquires the direction of warpage and the amount of warpage of the strip-shaped body S. Thus, in step S110, the screen 103 is imaged to acquire a captured image including the screen image 35 as information for acquiring the direction of warpage and the amount of warpage of the strip-shaped body S. The imaging unit 105 outputs the acquired captured image to the arithmetic processing apparatus 200.

When the captured image is inputted to the arithmetic processing apparatus 200 from the imaging unit 105, the arithmetic processing apparatus 200 uses the screen image length acquisition unit 210 to acquire the line length of the screen image included in the captured image (S120). The line length of the screen image is the length traced along a direction corresponding to the width direction of the strip-shaped body S, and in the present embodiment corresponds to the line length $L_2$ of the screen image 35 on the screen 103 shown in FIG. 6. The arithmetic processing apparatus 200 acquires the line length of the screen image in the captured image, and converts the line length of the screen image in the acquired captured image to the line length of the screen image 35 on the screen 103; and can thereby acquire the line length $L_2$ of the actual screen image 35. The value obtained by multiplying the line length of the screen image in the captured image by the shooting resolution is the line length of the screen image 35 on the screen 103, and it is assumed that the shooting resolution is acquired in advance.

Then, the arithmetic processing apparatus 200 uses the warpage calculation unit 220 to calculate the amount of unevenness in the width direction of the strip-shaped body S from the line length $L_2$ of the screen image 35 acquired in step S120 (S130). The amount of unevenness in the width direction of the strip-shaped body S is specifically the direction of warpage and the amount of warpage in the width direction of the strip-shaped body S. The warpage calculation unit 220 refers to the storage unit 240 and calculates the amount of unevenness of the strip-shaped body corresponding to the line length $L_2$ of the screen image 35 acquired in step S120, on the basis of the relationship between the line length of the screen image 35 and the amount of unevenness in the width direction of the strip-shaped body S acquired in advance.

For example, FIG. 11 shows an example of the relationship between the line length of the screen image 35 and the amount of unevenness in the width direction of the strip-shaped body S stored in the storage unit 240. FIG. 11 shows the relationship between the line length $L_2$ of the screen image 35 and the amount of unevenness H in the width direction of the strip-shaped body S acquired by simulation, on the assumption that, in the screen image acquisition apparatus 100 shown in FIG. 6, the width W of the strip-shaped body S is 1000 mm, the distance $d_1$ in the longitudinal direction (the Y-direction) from the linear light source 101 to the irradiation position of linear light of the strip-shaped body S is 1000 mm, and the distance $d_2$ from the irradiation position of linear light of the strip-shaped body S to the projection surface 103a of the screen 103 is 1500 mm. The amount of unevenness H is the maximum value of the difference between thicknesswise positions in the width direction of the strip-shaped body S. In FIG. 11, for the amount of unevenness H, the state where the strip-shaped body S is warped upward (in FIG. 11, written as "CONVEX") is expressed by a positive value, and the state where the strip-shaped body S is warped downward (in FIG. 11, written as "CONCAVE") is expressed by a negative value, on the assumption that the state where the strip-shaped body S has no warpage in the width direction is zero.

As shown in FIG. 11, as the absolute value of the amount of unevenness H increases, that is, as the amount of warpage increases, the line length of the screen image increases or decreases monotonically due to the convex mirror effect or the concave mirror effect. From this relationship, the state of the warpage in the width direction in the position in the longitudinal direction of the strip-shaped body S where the captured image is acquired can be acquired from the length $L_2$ of the screen image acquired by the image analysis of the captured image.

Thus, the shape measurement method according to the present embodiment uses the principle of the optical lever, and acquires the amount of unevenness in the width direction of the strip-shaped body S from the length of the reflected light projected on the screen 103 that is obtained by the specular reflection of linear light applied along the width direction of the strip-shaped body S.

Here, as another method for measuring the surface shape of the measurement object, there is a light section method in which linear light is directly applied from a direction perpendicular to the surface of the measurement object, and the surface shape is measured by height data obtained by acquiring light that is reflected on the surface of the measurement object in an oblique direction. In the case where the light section method is used for the measurement of the warpage state in the width direction of the strip-shaped body S, the amount of unevenness of the strip-shaped body S in the irradiation position of linear light 15 on the strip-shaped body S can be directly acquired. However, in other words, the amount of unevenness itself of the strip-shaped body S in the irradiation position of linear light 15 on the strip-shaped body S is measured, and therefore the sensitivity to the change in the amount of unevenness in the width direction of the strip-shaped body S is once at most.

On the other hand, the shape measurement method according to the present embodiment uses the principle of the optical lever that enlarges a small change, such as in the case where the line length $L_2$ of the screen image 35 becomes larger than the line length of linear light on the strip-shaped body S. Accordingly, the proportion of the change in the line length $L_2$ of the screen image 35 to the amount of unevenness in the width direction of the strip-shaped body S can be made larger than the proportion of the change in the line length of linear light on the strip-shaped body S to the amount of unevenness in the width direction of the strip-shaped body S, for example, and the sensitivity to the change in the amount of unevenness can be enhanced.

For example, the inclination of the approximate straight line shown in FIG. 11 that expresses the relationship between the line length of the screen image 35 and the amount of unevenness in the width direction of the strip-shaped body S is approximately 2.5. Hence, when the amount of unevenness in the width direction of the strip-shaped body S is, for example, +10 mm, the line length $L_2$ of the screen image 35 is 25 mm longer than the length in the state where there is no warpage. On the other hand, in the case where the light section method is used, the amount of unevenness in the width direction of the strip-shaped body S of the measurement object is directly measured, and therefore the measurement sensitivity is once at most. Thus, by the shape measurement method according to the present embodiment, the state of the warpage in the width direction of the strip-shaped body S can be measured with high sensitivity. Although the inclination of the approximate straight line is approximately 2.5 in this design condition, the inclination of the approximate straight line can be increased by an alteration of the configuration of the apparatus, such as placing the screen 103 farther, and therefore still higher sensitivity measurement than in the light section method can be achieved.

(2-2. Second Embodiment: Linear Light Irradiation from Line Side)

Next, shape measurement methods according to a second embodiment that measure the state of the warpage in the width direction of the strip-shaped body S are described on the basis of FIG. 12 to FIG. 18. In the present embodiment, the shape measurement method in the case where linear light is applied to the surface of the strip-shaped body S from the line side of the conveyance line on which the strip-shaped body S is conveyed (the lateral side in the width direction (the X-direction)) is described using two forms with different states of installation of the linear light source. In the following, a detailed description of configuration, processing, etc. similar to those of the first embodiment is omitted.

(A) there is No Turn of Linear Light Source

Figure 12:
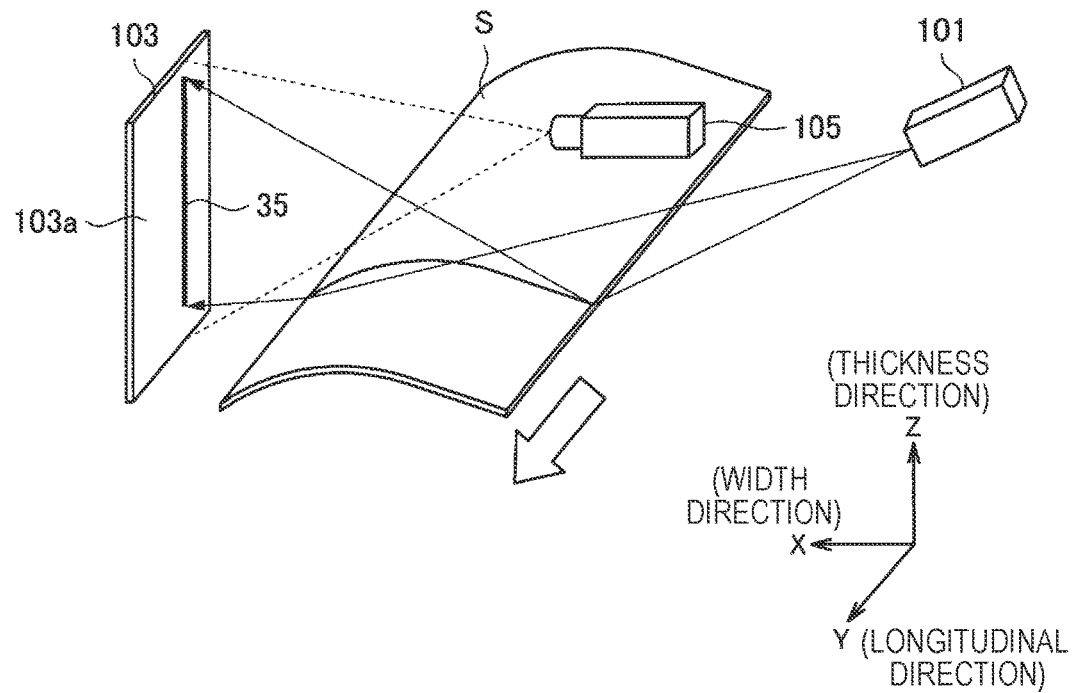
FIG. 12 is an explanatory diagram showing an example of the configuration of a screen image acquisition apparatus of a shape measurement apparatus according to a second embodiment of the present invention.
Figure 13:
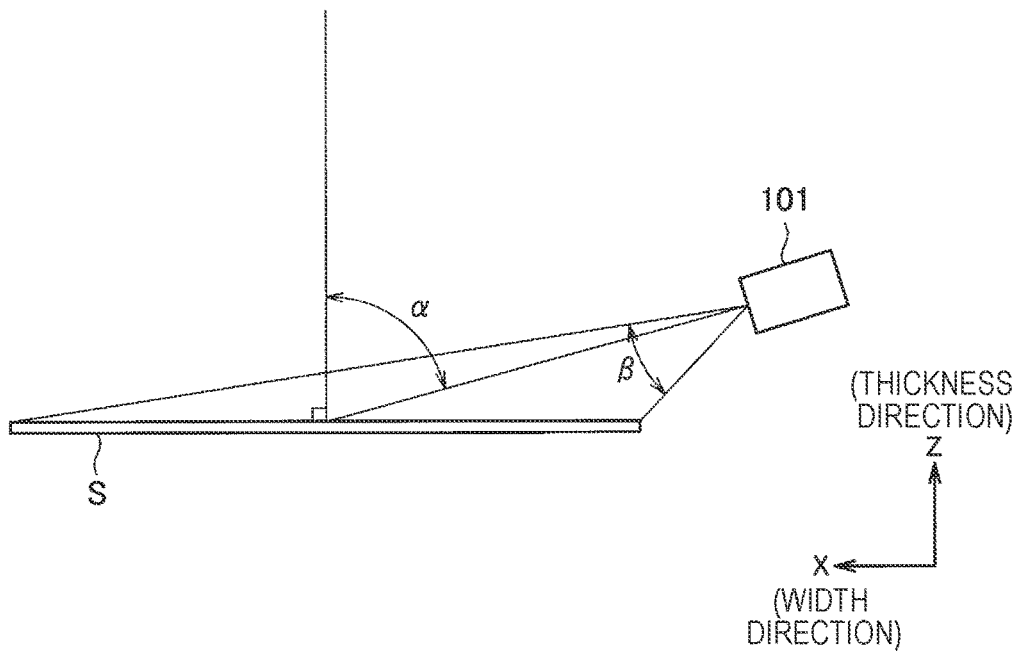
FIG. 13 is an explanatory diagram describing the angle of incidence and the angle of spread of a linear light source according to the embodiment.

First, a shape measurement method using a screen image acquisition apparatus 100 in which the linear light source 101 is placed so that the direction of spread of the linear light source 101 is parallel to the width direction of the strip-shaped body S (the X-direction) is described on the basis of FIG. 12 and FIG. 13. FIG. 12 is an explanatory diagram showing an example of the configuration of the screen image acquisition apparatus 100 of the shape measurement apparatus 10 according to the present embodiment. FIG. 13 is an explanatory diagram describing the angle of incidence α and the angle of spread β of the linear light source 101.

In the present embodiment, as shown in FIG. 12, linear light is applied to the surface of the strip-shaped body S from the line side of the conveyance line on which the strip-shaped body S is conveyed. That is, in the screen image acquisition apparatus 100, as shown in FIG. 12, the linear light source 101 is placed on the line side, and the screen 103 is placed so as to face the linear light source 101 in the width direction. The linear light emitted from the linear light source 101 is applied to the surface of the strip-shaped body S so as to extend in the width direction of the strip-shaped body S, and the reflected light is projected on the projection surface 103a of the screen 103 placed to face the linear light source 101.

Also in the present embodiment, it is preferable that the linear light source 101 shown in FIG. 13 be set so as to be within the ranges of the upper and lower limits of the wavelength of linear light, the upper and lower limits of the angle of incidence of linear light, and the upper limit of the line width on the surface of the strip-shaped body in the first embodiment.

The angle of spread β of linear light emitted from the linear light source 101 shown in FIG. 13 is set so that the entire width direction of the strip-shaped body S is irradiated with linear light. Specifically, the angle of spread β is determined in accordance with the distance in the width direction of the strip-shaped body S (the X-direction) from the linear light source 101 to the irradiation position on the surface of the strip-shaped body S and the width W of the strip-shaped body S. In the example shown in FIG. 12, the linear light source 101 is placed so that the spread direction is parallel to the width direction of the strip-shaped body S (the X-direction). Such an installation state of the linear light source 101 is regarded as a state of no turn around the optical axis of the linear light source 101. That is, the linear light applied to the surface of the strip-shaped body S is parallel to the width direction of the strip-shaped body S. Therefore, when the reflected light of the linear light applied to the surface of the strip-shaped body S is projected on the projection surface 103a of the screen 103, a linear screen image 35 extending in the thickness direction of the screen 103 (the Z-direction) appears.

The shape measurement method executed using the screen image acquisition apparatus 100 like this is performed by the processing sequence shown in FIG. 9 similarly to the first embodiment. That is, first, linear light is applied from the linear light source 101 to the surface of the strip-shaped body S moving on the conveyance line (S100). When light is emitted from the linear light source 101, the surface of the strip-shaped body S is irradiated with linear light as shown in FIG. 12. Then, the reflected light of the linear light reflected on the surface of the strip-shaped body S is projected as a screen image 35 on the projection surface 103a of the screen 103.

Next, the imaging unit 105 images the screen 103 on which the reflected light of the linear light reflected on the surface of the strip-shaped body S is projected, and acquires a captured image including the screen image 35 (S110). The screen image 35 projected on the screen 103 changes with the shape of the warpage in the width direction of the strip-shaped body S. For example, in the state of downward warpage in which a central portion in the width direction of the strip-shaped body S is convex downward, the line length of the screen image 35 projected on the screen 103 is shorter than the line length of a screen image obtained when the strip-shaped body S is flat, that is, has no warpage, due to the action of the concave mirror. On the other hand, in the state of upward warpage in which a central portion in the width direction of the strip-shaped body S is convex upward, the line length of the screen image 35 projected on the screen 103 is longer than the line length of a screen image obtained when the strip-shaped body S is flat, that is, has no warpage, due to the action of the convex mirror. The shape measurement method according to the present embodiment uses these characteristics, and thereby acquires the direction of warpage and the amount of warpage of the strip-shaped body S. Thus, in step S110, the screen 103 is imaged to acquire a captured image including the screen image 35 as information for acquiring the direction of warpage and the amount of warpage of the strip-shaped body S. The imaging unit 105 outputs the acquired captured image to the arithmetic processing apparatus 200.

When the captured image is inputted to the arithmetic processing apparatus 200 from the imaging unit 105, the arithmetic processing apparatus 200 uses the screen image length acquisition unit 210 to acquire the line length of the screen image included in the captured image (S120). The line length of the screen image is the length traced along a direction corresponding to the width direction of the strip-shaped body 5, and in the present embodiment corresponds to the line length of the screen image 35 on the screen 103 shown in FIG. 12. The arithmetic processing apparatus 200 acquires the line length of the screen image in the captured image, and converts the line length of the screen image in the acquired captured image to the line length of the screen image 35 on the screen 103; and can thereby acquire the line length of the actual screen image 35. The value obtained by multiplying the line length of the screen image in the captured image by the shooting resolution is the line length of the screen image 35 on the screen 103, and it is assumed that the shooting resolution is acquired in advance.

Then, the arithmetic processing apparatus 200 uses the warpage calculation unit 220 to calculate the amount of unevenness in the width direction of the strip-shaped body S from the line length of the screen image 35 acquired in step S120 (S130). The amount of unevenness in the width direction of the strip-shaped body S is specifically the direction of warpage and the amount of warpage in the width direction of the strip-shaped body S. The warpage calculation unit 220 refers to the storage unit 240 and calculates the amount of unevenness of the strip-shaped body corresponding to the line length of the screen image 35 acquired in step S120, on the basis of the relationship between the line length of the screen image 35 and the amount of unevenness in the width direction of the strip-shaped body S acquired in advance.

Similarly to the first embodiment described above, also this shape measurement method uses the principle of the optical lever, and acquires the amount of unevenness in the width direction of the strip-shaped body S from the length of the reflected light projected on the screen 103 that is obtained by the specular reflection of linear light applied along the width direction of the strip-shaped body S. Thus, the state of the warpage in the width direction of the strip-shaped body S can be measured with high sensitivity.

(B) There is Turn of Linear Light Source

Figure 14A:
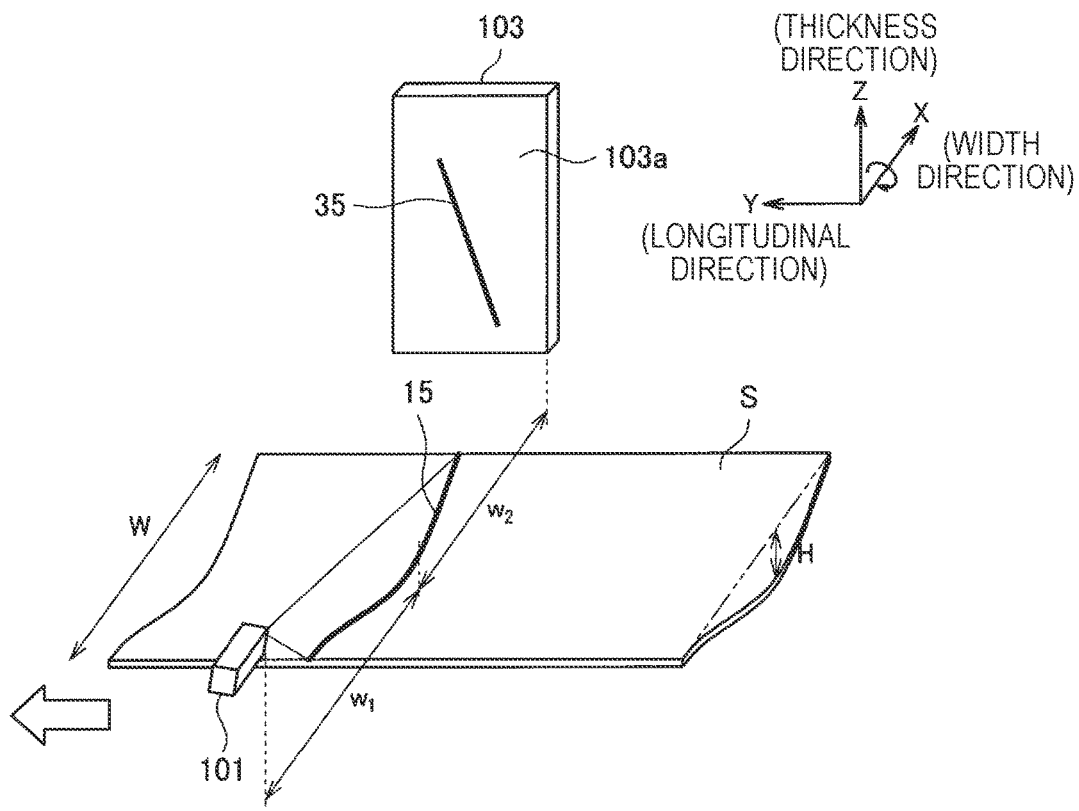
FIG. 14A is an explanatory diagram showing an example of the configuration of a screen image acquisition apparatus of a shape measurement apparatus according to the embodiment in the case where a linear light source is placed in a state of being rotated around the optical axis.
Figure 16:
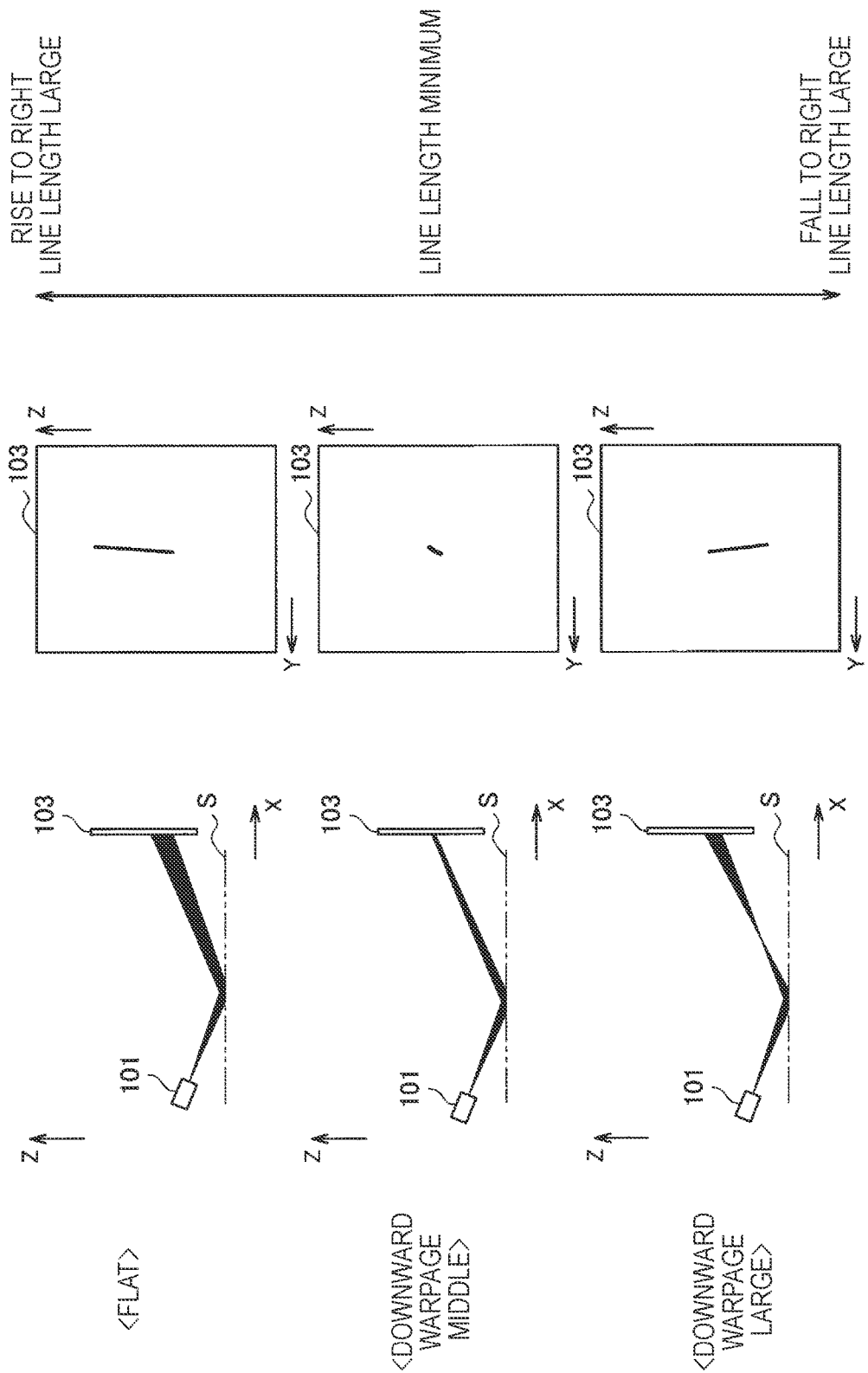
FIG. 16 is an explanatory diagram showing changes in the line length of a screen image due to changes in the amount of warpage (the amount of unevenness) in the width direction of a strip-shaped body.
Figure 17:
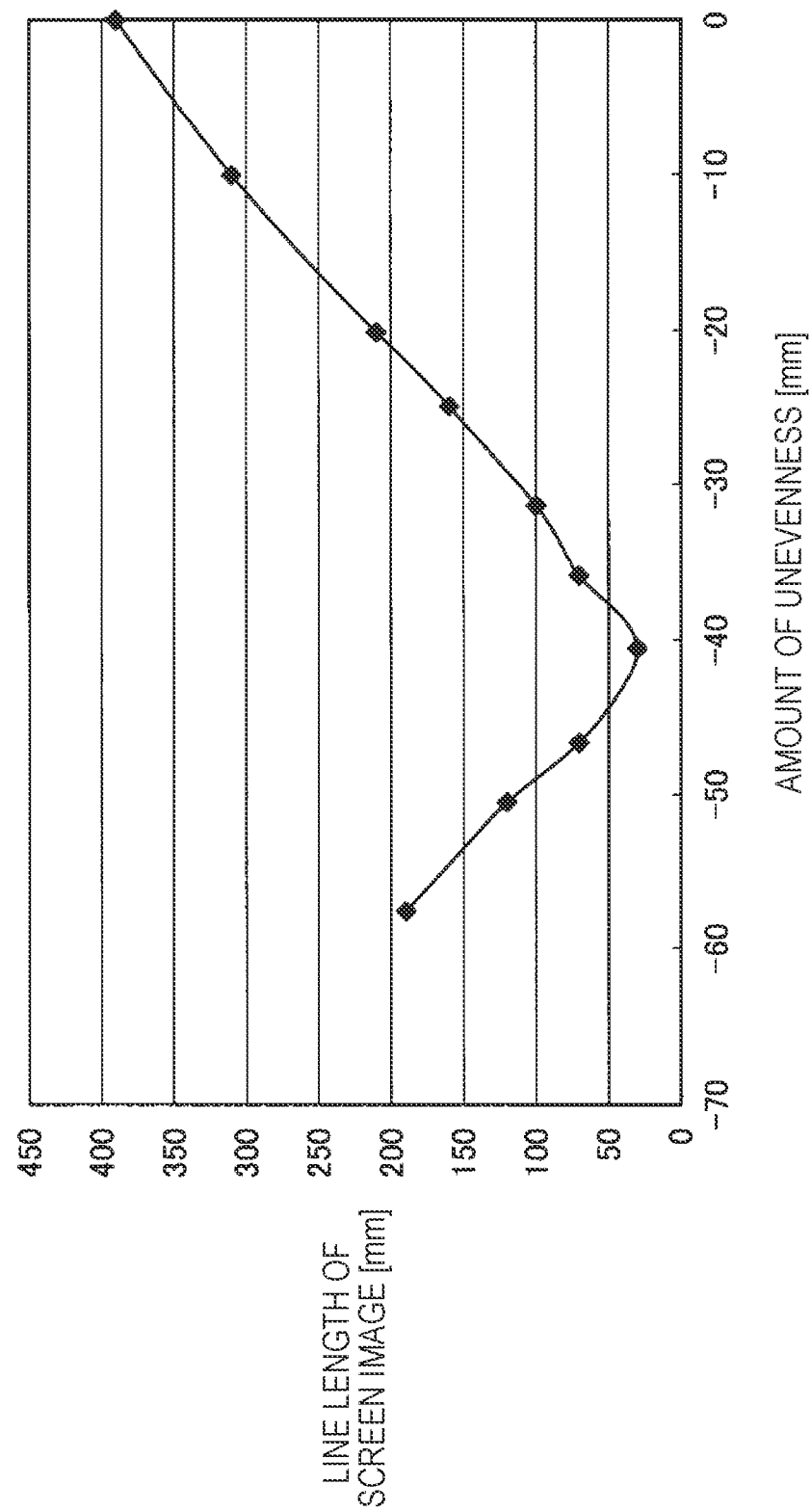
FIG. 17 is a graph showing an example of the relationship between the amount of warpage (the amount of unevenness) in the width direction of a strip-shaped body and the length of a screen image.

Next, a shape measurement method using a screen image acquisition apparatus 100 in which the linear light source 101 is placed in a state of being rotated around the optical axis is described on the basis of FIG. 14A to FIG. 18. FIG. 14A is an explanatory diagram showing an example of the configuration of the screen image acquisition apparatus 100 of the shape measurement apparatus 10 according to the present embodiment, and showing the case where the linear light source 101 is placed in a state of being rotated around the optical axis. FIG. 14B is an explanatory diagram showing the rotation state around the optical axis of the linear light source 101 shown in FIG. 14A. FIG. 15 is an explanatory diagram describing the state of linear light applied to the surface of the strip-shaped body S when the linear light source 101 is rotated around the optical axis. FIG. 16 is an explanatory diagram showing changes in the line length of a screen image due to changes in the amount of warpage (the amount of unevenness) in the width direction of the strip-shaped body S. FIG. 17 is a graph showing an example of the relationship between the amount of warpage (the amount of unevenness) in the width direction of the strip-shaped body S and the length of the screen image. FIG. 18 is an explanatory diagram describing a change of a screen image when the linear light source 101 is provided with a turn angle around the optical axis.

Also in the present example, as shown in FIG. 14A, linear light is applied to the surface of the strip-shaped body S from the line side of the conveyance line on which the strip-shaped body S is conveyed. That is, the screen image acquisition apparatus 100 is configured such that the linear light source 101 is placed on the line side and the screen 103 is placed so as to face the linear light source 101 in the width direction. The linear light emitted from the linear light source 101 is applied to the surface of the strip-shaped body S so as to extend in the width direction of the strip-shaped body S, and the reflected light is projected on the projection surface 103a of the screen 103 placed to face the linear light source 101.

Also in the present example, like in the case of (A) above, the linear light source 101 is preferably set so as to be within the ranges of the upper and lower limits of the wavelength of linear light, the upper and lower limits of the angle of incidence of linear light, and the upper limit of the line width on the surface of the strip-shaped body in the first embodiment. Further, the angle of spread β (see FIG. 13) of linear light emitted from the linear light source 101 is set so that the entire width direction of the strip-shaped body S is irradiated with linear light.

Figure 14B:
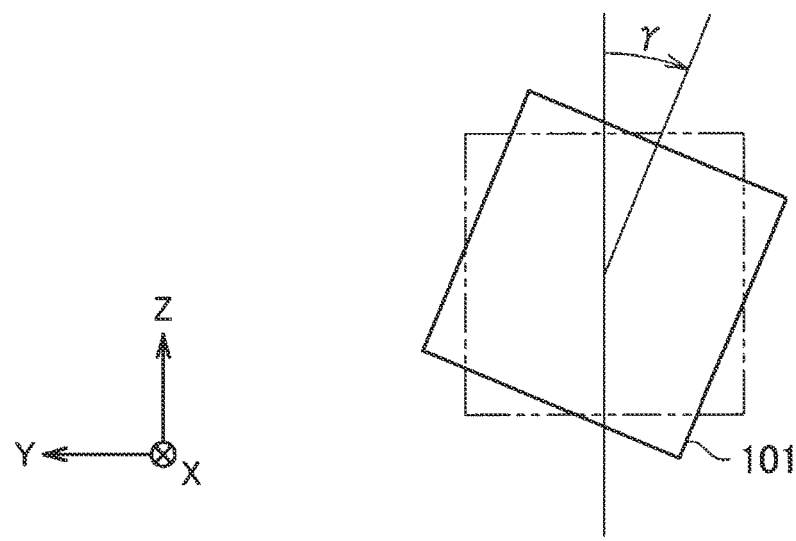
FIG. 14B is an explanatory diagram showing the rotation state around the optical axis of the linear light source shown in FIG. 14A.

Here, in the present example, the linear light source 101 is, as shown in FIG. 14B, installed in a state of being rotated from the state of (A) above in which the linear light source 101 is placed so that the spread direction is parallel to the width direction of the strip-shaped body S (the X-direction), by a prescribed turn angle γ around the optical axis of the linear light source 101. FIG. 15 is an explanatory diagram showing the state of linear light applied to the surface of the strip-shaped body S when the linear light source 101 is rotated around the optical axis. As shown in the left side of FIG. 15, in the state of (A) above in which there is no turn of the linear light source 101, the linear light emitted from the linear light source 101 is applied to the surface of the strip-shaped body S perpendicularly to the surface of the strip-shaped body S while spreading in a plane extending in the width direction. Therefore, when projected on the screen 103, the reflected light reflected on the surface of the strip-shaped body S appears as a straight-lined screen image parallel to the thickness direction (the Z-direction).

On the other hand, as shown in the right side of FIG. 15, in the case where the linear light source 101 is placed in a turn state of being rotated around the optical axis as in the present example, the linear light emitted from the linear light source 101 is applied to the surface of the strip-shaped body S perpendicularly to the surface of the strip-shaped body S while spreading in a plane rotated from a plane extending in the width direction by a turn angle γ. Hence, on the surface of the strip-shaped body S, linear light 15 is applied with inclination with respect to the width direction of the strip-shaped body S (the X-direction). Therefore, when projected on the screen 103, the reflected light reflected on the surface of the strip-shaped body S appears as a linear screen image inclined with respect to the thickness direction (the Z-direction). The screen image changes in line length and inclination in accordance with the state of the warpage in the width direction of the strip-shaped body S.

FIG. 16 shows changes in the line length of a screen image in the case where a turn is given in the opposite direction from the turn described in FIG. 14B. For example, as shown in the upper side of FIG. 16, in the case where the strip-shaped body S has no warpage in the width direction and has a flat surface shape, the linear light emitted from the linear light source 101 appears as a linear screen image rising to the right when it is reflected on the surface of the strip-shaped body S and projected on the screen 103. With a screen image on the occasion when the surface shape is flat as a reference, as the upward warpage in which the strip-shaped body S is convex upward in the width direction becomes larger, the line length increases while the screen image remains rising to the right (not illustrated). On the other hand, with a screen image on the occasion when the surface shape is flat as a reference, as the downward warpage in which the strip-shaped body S is convex downward in the width direction becomes larger, the line rising to the right of the screen image becomes shorter, and the line length of the screen image reaches the minimum on the occasion of an amount of warpage by which image formation is made on the screen position, as shown in the center of FIG. 16. Then, when the amount of warpage is further increased in the state of downward warpage, the relationship of image formation is reversed and the inclination of the linear screen image falls to the right (that is, rises to the left), as shown in the lower side of FIG. 16; and the line length increases while remaining falling to the right as the amount of warpage increases.

Thus, by installing the linear light source 101 while providing it with a turn angle γ and irradiating the surface of the strip-shaped body S with linear light, the amount of warpage (the amount of unevenness) can be acquired by the line length of the screen image like in the cases of the first embodiment and (A) above, and furthermore the direction and the degree of magnitude of warpage in the width direction of the strip-shaped body S can be identified by the change in the inclination of the linear screen image. The turn angle γ may be an angle that makes it possible to recognize the change in the inclination of the screen image, which may be acquired and set by experiment or the like, and may be set to, for example, approximately 10°.

Also the shape measurement method executed using the screen image acquisition apparatus 100 like this is performed by the processing sequence shown in FIG. 9. First, linear light is applied from the linear light source 101 to the surface of the strip-shaped body S moving on the conveyance line (S100). When light is emitted from the linear light source 101, the surface of the strip-shaped body S is irradiated with linear light as shown in FIG. 6. Then, the reflected light of the linear light reflected on the surface of the strip-shaped body S is projected as a screen image 35 on the projection surface 103a of the screen 103.

Next, the imaging unit 105 images the screen 103 on which the reflected light of the linear light reflected on the surface of the strip-shaped body S is projected, and acquires a captured image including the screen image 35 (S110). The screen image 35 projected on the screen 103 changes with the shape of the warpage in the width direction of the strip-shaped body S as shown in FIG. 16. In step S110, the screen 103 is imaged to acquire a captured image including the screen image 35 as information for acquiring the direction of warpage and the amount of warpage of the strip-shaped body S. The imaging unit 105 outputs the acquired captured image to the arithmetic processing apparatus 200.

When the captured image is inputted to the arithmetic processing apparatus 200 from the imaging unit 105, the arithmetic processing apparatus 200 uses the screen image length acquisition unit 210 to acquire the line length of the screen image included in the captured image (S120). The line length of the screen image is the length traced along a direction corresponding to the width direction of the strip-shaped body S; the arithmetic processing apparatus 200 acquires the line length of the screen image in the captured image and converts the line length of the screen image in the acquired captured image to the line length of the screen image 35 on the screen 103, and can thereby acquire the line length of the actual screen image 35. The line length of the screen image in the captured image and the line length of the screen image 35 on the screen 103 are in a proportional relationship with the shooting resolution as the proportionality constant, and it is assumed that the shooting resolution is acquired in advance. In the present example, the screen image length acquisition unit 210 acquires also the inclination of the screen image included in the captured image. Thereby, the degree of magnitude of warpage can be grasped.

Then, the arithmetic processing apparatus 200 uses the warpage calculation unit 220 to calculate the amount of unevenness in the width direction of the strip-shaped body S from the line length of the screen image 35 acquired in step S120 (S130). The amount of unevenness in the width direction of the strip-shaped body S is specifically the direction of warpage and the amount of warpage in the width direction of the strip-shaped body S. The warpage calculation unit 220 refers to the storage unit 240 and calculates the amount of unevenness of the strip-shaped body corresponding to the line length of the screen image 35 acquired in step S120, on the basis of the relationship between the line length of the screen image 35 and the amount of unevenness in the width direction of the strip-shaped body S acquired in advance.

For example, FIG. 17 shows an example of the relationship between the line length of the screen image 35 and the amount of unevenness in the width direction of the strip-shaped body S stored in the storage unit 240. FIG. 17 shows the relationship between the line length of the screen image 35 and the amount of unevenness H in the width direction of the strip-shaped body S acquired by simulation, on the assumption that, in the screen image acquisition apparatus 100 shown in FIG. 14A, the width W of the strip-shaped body S is 1000 mm, the distance $w_1$ in the width direction (the X-direction) from the linear light source 101 to the irradiation position of linear light of the strip-shaped body S is 1000 mm, and the distance $w_2$ from the irradiation position of linear light of the strip-shaped body 5 to the projection surface 103a of the screen 103 is 1500 mm. The amount of unevenness H is the maximum value of the difference between thicknesswise positions in the width direction of the strip-shaped body S; for the amount of unevenness H, the state where the strip-shaped body S is warped upward is expressed by a positive value, and the state where the strip-shaped body S is warped downward is expressed by a negative value, on the assumption that the state where the strip-shaped body S has no warpage in the width direction is zero. FIG. 17 shows the relationship between the amount of unevenness H and the line length of the screen image in a downward warpage state. In the present simulation, the angle of incidence α of the linear light source 101 is set to 12°, and the turn angle γ is set to 10°.

As shown in FIG. 17, as the downward warpage becomes larger, that is, as the absolute value of the amount of unevenness H, which is a negative value, becomes larger, the line length of the screen image decreases from a flat state where there is no warpage, but the line length of the screen image increases after the image formation point. From this relationship, the state of the warpage in the width direction in the position in the longitudinal direction of the strip-shaped body S where the captured image is acquired can be acquired by the length of the screen image acquired by the image analysis of the captured image.

Here, as shown in FIG. 17, there is a case where the line length of the screen image is the same. In this case, the amount of downward warpage cannot be uniquely identified from the line length of the screen image. However, in the present example, since the linear light source 101 is installed in a state of being provided with a turn angle γ, the orientation of the screen image changes in accordance with the amount of warpage. For example, the line length of the screen image on the occasion when the amount of unevenness is −35.9 mm and the line length of the screen image on the occasion when the amount of unevenness is −46.7 mm are the same, and both are 70 mm. Hence, the degree of magnitude of downward warpage of the strip-shaped body S cannot be identified by the line length of the screen image alone. However, as shown in FIG. 18, the orientations of these screen images are different. Thus, the degree of magnitude of downward warpage can be identified on the basis of the orientation of the linear light source 101. Also in the case where the screen image has a bent portion like in FIG. 18, the line length of the screen image refers to the length of the curved line running along the screen image.

Similarly to the first embodiment described above, also this shape measurement method uses the principle of the optical lever, and acquires the amount of unevenness in the width direction of the strip-shaped body S from the length of the reflected light projected on the screen 103 that is obtained by the specular reflection of linear light applied along the width direction of the strip-shaped body S. Therefore, the state of the warpage in the width direction of the strip-shaped body S can be measured with high sensitivity. Furthermore, the degree of magnitude of warpage of the strip-shaped body S can be acquired by installing the linear light source 101 while providing it with a turn angle γ. Thus, even in the case where there are two amounts of unevenness having the same line length of the screen image, the amount of unevenness in the width direction of the strip-shaped body S can be identified.

Hereinabove, shape measurement methods that measure the state of the warpage in the width direction of a strip-shaped body using shape measurement apparatuses according to embodiments of the present invention are described. The shape measurement apparatus 10 can be used for, for example, the measurement of the mass per unit area of plating on the surface of a steel strip in the electroplating step of the steel process. In this step, if warpage occurs on the steel strip in the width direction, the distance between the steel strip and the electrode changes, and a variation occurs in the mass per unit area of plating attached to the surface of the steel strip. Thus, by using the shape measurement apparatus mentioned above, the amount of warpage in the width direction of the steel strip can be measured with high sensitivity, and consequently an operational effect in which variations in mass per unit area can be grasped in advance can be expected.

Figure 19:
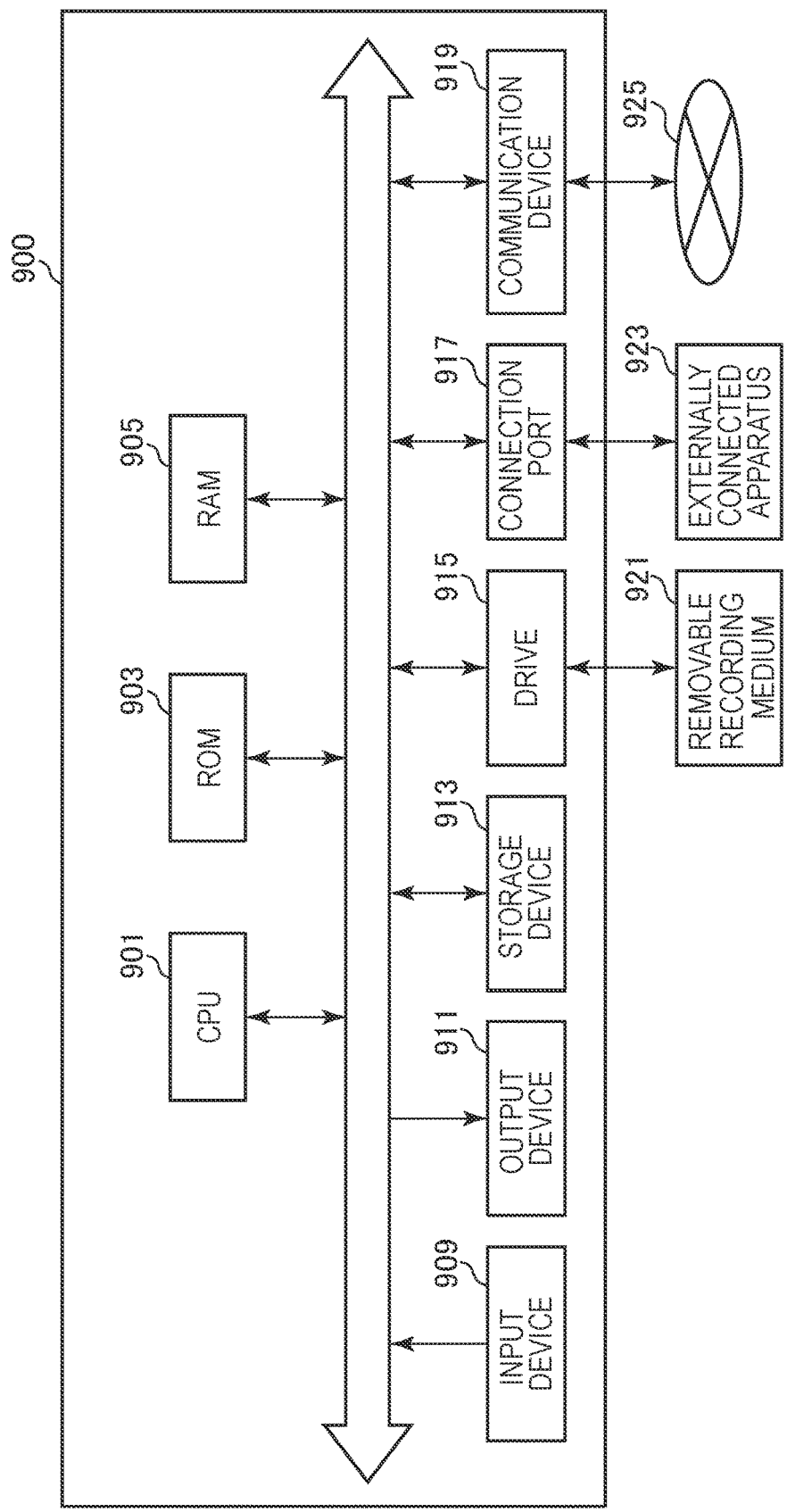
FIG. 19 is a block diagram for describing the hardware configuration of an information processing apparatus that serves as an arithmetic processing apparatus according to an embodiment of the present invention.

(3. Hardware Configuration)

the hardware configuration of the arithmetic processing apparatus 200 according to an embodiment of the present invention will be described in detail in FIG. 19. FIG. 19 is a block diagram for explaining the hardware configuration of an information processing apparatus 900 that serves as the arithmetic processing apparatus 200 according to an embodiment of the present invention.

The information processing apparatus 900 that serves as the arithmetic processing apparatus 200 mainly includes a CPU 901, a ROM 903, and a RAM 905. Furthermore, the information processing apparatus 900 also includes a bus 907, an input device 909, an output device 911, a storage device 913, a drive 915, a connection port 917, and a communication device 919.

The CPU 901 serves as an arithmetic processing apparatus and a control device, and controls the overall operation or a part of the operation of the information processing apparatus 900 according to various programs recorded in the ROM 903, the RAM 905, the storage device 913, or a removable recording medium 921. The ROM 903 stores programs, operation parameters, and the like used by the CPU 901. The RAM 905 primarily stores programs that the CPU 901 uses and parameters and the like varying as appropriate during the execution of the programs. These are connected with each other via the bus 907 configured from an internal bus such as a CPU bus or the like.

The bus 907 is connected to the external bus such as a PCI (Peripheral Component Interconnect/Interface) bus via the bridge.

The input device 909 is an operation means operated by a user, such as a mouse, a keyboard, a touch panel, buttons, a switch and a lever. The input device 909 may be a remote control means (a so-called remote control) using, for example, infrared light or other radio waves, or may be an externally connected apparatus 923 such as a PDA conforming to the operation of the information processing apparatus 900. Furthermore, the input device 909 generates an input signal based on, for example, information which is input by a user with the above operation means, and is configured from an input control circuit for outputting the input signal to the CPU 901. The user of the information processing apparatus 900 can input various data to the information processing apparatus 900 and can instruct the shape inspection apparatus 10 to perform processing by operating this input device 909.

The output device 911 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 911 outputs a result obtained by various processes performed by the information processing apparatus 900. More specifically, the display device displays, in the form of texts or images, a result obtained by various processes performed by the information processing apparatus 900. On the other hand, the audio output device converts an audio signal such as reproduced audio data and sound data into an analog signal, and outputs the analog signal.

The storage device 913 is a device for storing data configured as an example of a storage unit of the information processing apparatus 900 and is used to store data. The storage device 913 is configured from, for example, a magnetic storage device such as a HDD (Hard Disk Drive), a semiconductor storage device, an optical storage device, or a magneto-optical storage device. This storage device 913 stores programs to be executed by the CPU 901, various data, and various data obtained from the outside.

The drive 915 is a reader/writer for recording medium, and is embedded in the information processing apparatus 900 or attached externally thereto. The drive 915 reads information recorded in the attached removable recording medium 921 such as a magnetic disk, an optical disk, a magneto-optical disk, or a semiconductor memory, and outputs the read information to the RAM 905. Furthermore, the drive 915 can write in the attached removable recording medium 921 such as a magnetic disk, an optical disk, a magneto-optical disk, or a semiconductor memory. The removable recording medium 921 is, for example, a CD medium, a DVD medium, or a Blu-ray (registered trademark) medium. The removable recording medium 921 may be a CompactFlash (CF; registered trademark), a flash memory, an SD memory card (Secure Digital Memory Card), or the like. Alternatively, the removable recording medium 921 may be, for example, an IC card (Integrated Circuit Card) equipped with a non-contact IC chip or an electronic device.

The connection port 917 is a port for allowing devices to directly connect to the information processing apparatus 900. Examples of the connection port 917 include a USB (Universal Serial Bus) port, an IEEE1394 port, a SCSI (Small Computer System Interface) port, an RS-232C port, and the like. By the externally connected apparatus 923 connecting to this connection port 917, the information processing apparatus 900 directly obtains various data from the externally connected apparatus 923 and provides various data to the externally connected apparatus 923.

The communication device 919 is a communication interface configured from, for example, a communication device for connecting to a communication network 925. The communication device 919 is, for example, a wired or wireless LAN (Local Area Network), Bluetooth (registered trademark), a communication card for WUSB (Wireless USB), or the like. Alternatively, the communication device 919 may be a router for optical communication, a router for ADSL (Asymmetric Digital Subscriber Line), a modem for various communications, or the like. This communication device 919 can transmit and receive signals and the like in accordance with a predetermined protocol such as TCP/IP on the Internet and with other communication devices, for example. The communication network 925 connected to the communication device 919 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 900 according to an embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 10 shape measurement apparatus
100 screen image acquisition apparatus
101 linear light source
103 screen
105 imaging unit
200 arithmetic processing apparatus
210 screen image length acquisition unit
220 warpage calculation unit
230 output unit
240 storage unit
S strip-shaped body

The invention claimed is:

1. A shape measurement apparatus comprising:
a light source configured to irradiate a surface of a moving strip-shaped body with linear light at a prescribed angle of incidence;
a screen configured such that reflected light of the linear light on the surface of the strip-shaped body is projected on the screen;
a camera configured to image the reflected light of the linear light projected on the screen; and
an arithmetic processor configured to acquire the amount of warpage in a width direction of the strip-shaped body on the basis of a line length of the reflected light of the linear light imaged by the camera,
wherein the arithmetic processor includes
a screen image length acquisition unit configured to acquire a line length of a screen image that is reflected light of the strip-shaped body included in a captured image acquired by the camera, and
a warpage calculation unit configured to calculate, on the basis of the line length of the screen image acquired by the screen image length acquisition unit, the amount of warpage in the width direction of the strip-shaped body from a relationship between a line length of reflected light of the strip-shaped body and the amount of warpage in the width direction of the strip-shaped body acquired in advance.

2. The shape measurement apparatus according to claim 1,
wherein the light source irradiates the surface of the strip-shaped body with the linear light of a wavelength of not less than 200 nm and not more than 1700 nm at the angle of incidence of not less than 74° and not more than 88°, and
a line width of the linear light along a longitudinal direction of the strip-shaped body on the surface of the strip-shaped body is 2 mm or less.

3. The shape measurement apparatus according to claim 1,
wherein the light source irradiates the surface of the strip-shaped body with the linear light diagonally from an upstream side or a downstream side in a movement direction of the strip-shaped body.

4. The shape measurement apparatus according to claim 1,
wherein the light source irradiates the surface of the strip-shaped body with the linear light from a line side of a line on which the strip-shaped body moves.

5. The shape measurement apparatus according to claim 4,
wherein the light source is configured to be rotated around an optical axis of the light source by a prescribed angle.

6. The shape measurement apparatus according to claim 5,
wherein the arithmetic processor includes
a screen image length acquisition unit configured to acquire a line length of a screen image that is reflected light of the strip-shaped body included in a captured image acquired by the camera, and
a warpage calculation unit configured to calculate, on the basis of the line length of the screen image acquired by the screen image length acquisition unit, the amount of warpage in the width direction of the strip-shaped body from a relationship between a line length of reflected light of the strip-shaped body and the amount of warpage in the width direction of the strip-shaped body acquired in advance, and
the warpage calculation unit identifies the amount of warpage of the strip-shaped body on the basis of the relationship between a line length of reflected light of the strip-shaped body and the amount of warpage in the width direction of the strip-shaped body acquired in advance, and an inclination of the screen image in the captured image acquired by the camera.

7. A shape measurement method comprising:
a first step of using a light source to irradiate a surface of a moving strip-shaped body with linear light at a prescribed angle of incidence, and using a camera to image a screen on which reflected light of the linear light on the surface of the strip-shaped body is projected and acquiring a captured image in which a screen image that is reflected light of the strip-shaped body is included; and
a second step of acquiring the amount of warpage in a width direction of the strip-shaped body on the basis of a line length of the screen image included in the captured image,
wherein the second step includes a screen image length acquisition step of acquiring a line length of a screen image that is reflected light of the strip-shaped body included in a captured image acquired by the camera, and
a warpage calculation step of calculating, on the basis of the line length of the screen image acquired by the screen image length acquisition unit, the amount of warpage in the width direction of the strip-shaped body from a relationship between a line length of reflected light of the strip-shaped body and the amount of warpage in the width direction of the strip-shaped body acquired in advance.

* * * * *